US010885050B2

(12) United States Patent
Barsness et al.

(10) Patent No.: US 10,885,050 B2
(45) Date of Patent: *Jan. 5, 2021

(54) ALTERING IN-FLIGHT STREAMED DATA FROM A RELATIONAL DATABASE

(71) Applicant: International Business Machines Corporation, Armonk, NY (US)

(72) Inventors: Eric L. Barsness, Pine Island, MN (US); Daniel E. Beuch, Rochester, MN (US); Alexander Cook, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 500 days.

This patent is subject to a terminal disclaimer.

(21) Appl. No.: 15/782,793

(22) Filed: Oct. 12, 2017

(65) Prior Publication Data

US 2018/0121448 A1 May 3, 2018

Related U.S. Application Data

(63) Continuation of application No. 15/339,819, filed on Oct. 31, 2016, now Pat. No. 9,836,467.

(51) Int. Cl.
*G06F 7/00* (2006.01)
*G06F 16/25* (2019.01)
*G06F 16/2455* (2019.01)

(52) U.S. Cl.
CPC ...... *G06F 16/252* (2019.01); *G06F 16/24568* (2019.01); *G06F 16/258* (2019.01)

(58) Field of Classification Search
CPC ............. G06F 16/252; G06F 16/24568; G06F 16/258; G06F 9/4881; G06F 9/48
See application file for complete search history.

(56) References Cited

U.S. PATENT DOCUMENTS

| | | | |
|---|---|---|---|
| 5,913,912 | A | 6/1999 | Nishimura et al. |
| 6,353,821 | B1 | 3/2002 | Gray |
| 7,774,336 | B2 | 8/2010 | Beyer et al. |

(Continued)

OTHER PUBLICATIONS

Beth Plale et al., "Dynamic Querying of Streaming Data with the dQUOB System", IEEE Transactions on Parallel and Distributed Systems, vol. 14, No. 4, pp. 422-426 (Apr. 2003).

(Continued)

*Primary Examiner* — Azam M Cheema
(74) *Attorney, Agent, or Firm* — Roy W. Truelson

(57) ABSTRACT

A database which receives input from a data streaming application may include in-flight streamed data within the scope of a command which alters database data. Preferably, the streaming application produces data tuples for input to at least one table of the database. A user submitting modify data commands to apply to multiple tuples meeting some specified logical parameters may define the command scope to include in-flight data in the streaming application, causing the database manager to forward the command to the streaming application. A streaming application manager invokes database agents in respective nodes of the streaming application, which identify in-flight data meeting the specified logical parameters of the command, and apply the modify data operation to such data.

17 Claims, 17 Drawing Sheets

(56) References Cited

U.S. PATENT DOCUMENTS

| | | | |
|---|---|---|---|
| 7,849,227 B2 | 12/2010 | Kashiyama et al. | |
| 8,286,191 B2 | 10/2012 | Amini et al. | |
| 8,886,822 B2 | 11/2014 | Pedersen et al. | |
| 8,959,313 B2 | 2/2015 | Santosuosso et al. | |
| 8,990,416 B2 | 3/2015 | Shukla et al. | |
| 9,286,352 B2 | 3/2016 | Park et al. | |
| 9,325,742 B1 | 4/2016 | Barsness et al. | |
| 9,563,486 B1 * | 2/2017 | Narsude | H04L 65/60 |
| 9,659,063 B2 | 5/2017 | Cammert et al. | |
| 9,805,095 B2 | 10/2017 | Deshmukh et al. | |
| 9,836,467 B1 * | 12/2017 | Barsness | G06F 16/252 |
| 10,025,826 B2 | 7/2018 | Barsness et al. | |
| 10,127,283 B2 | 11/2018 | Barsness et al. | |
| 10,515,080 B2 | 12/2019 | Barsness et al. | |
| 2004/0268244 A1 | 12/2004 | Levanoni et al. | |
| 2006/0064579 A1 | 3/2006 | Aaron et al. | |
| 2006/0230029 A1 | 10/2006 | Yan | |
| 2007/0006173 A1 | 1/2007 | Sohm et al. | |
| 2007/0112866 A1 * | 5/2007 | Olson-Williams | G06F 16/22 |
| 2007/0136254 A1 | 6/2007 | Choi et al. | |
| 2009/0150396 A1 * | 6/2009 | Elisha | G06F 16/211 |
| 2011/0064079 A1 | 3/2011 | Lim et al. | |
| 2011/0239048 A1 | 9/2011 | Andrade et al. | |
| 2012/0179809 A1 | 7/2012 | Barsness et al. | |
| 2013/0091123 A1 | 4/2013 | Chen et al. | |
| 2013/0111038 A1 | 5/2013 | Girard | |
| 2013/0212066 A1 * | 8/2013 | Dehn | G06F 16/23 707/610 |
| 2013/0239100 A1 | 9/2013 | Andrade et al. | |
| 2014/0095462 A1 | 4/2014 | Park et al. | |
| 2014/0095473 A1 | 4/2014 | Srinivasan et al. | |
| 2015/0142952 A1 | 5/2015 | Bragstad et al. | |
| 2015/0227415 A1 | 8/2015 | Alves et al. | |
| 2016/0342658 A1 | 11/2016 | Skrzypczak et al. | |
| 2017/0116050 A1 | 4/2017 | Thukkaram et al. | |
| 2017/0116210 A1 | 4/2017 | Park et al. | |
| 2017/0116283 A1 | 4/2017 | Park et al. | |
| 2018/0246936 A1 | 8/2018 | Srinivasan et al. | |
| 2019/0102431 A1 | 4/2019 | Bishnoi et al. | |

OTHER PUBLICATIONS

Diong Zou et al, "From a Stream of Relational Queries to Distributed Stream Processing", Proceedings of the VLDB Endowment, vol. 3, No. 2, 2010, pp. 1394-1405 (Sep. 2010).

Gabriela Jacques-Silva et al, "Consistent Regions Guaranteed Tuple Processing in IBM Streams", Proceedings of the VLDB Endowment, vol. 9, No. 13, pp. 1341-1342 (2016).

Anonymous, PipelineDB Home Page, (Archived screen shot of page published on World Wide Web at http://www.pipelinedb.com, available from https://web.archive.org/web/*/www.pipelinedb.com, archived on Oct. 13, 2016, original publication date unknown).

Anonymous, PipelineDB Docs, (Archived screen shots of multiple pages published on World Wide Web at http://docs.pipelinedb.com, available from //https://web.archive.org/web/*/docs.pipelinedb.com, archived on Aug. 25, 2016, original publication date unknown).

Anonymous, PipelineDB Examples, (Archived screen shots of multiple pages published on World Wide Web at http://pipelinedb.com/examples, available from https://web.archive.org/web/*/www.pipelinedb.com/examples, archived on Dec. 21, 2015, original publication date unknown).

Avnur et al, "Eddies: Continuously Adaptive Query Processing", ACM SIGMOD Record vol. 29, No. 2, ACM, 2000.

Babu et al., "Adaptive Ordering of Pipelined Stream Filters", ACM SIGMOD 2004 Jun. 13-18, 2004, Paris, France.

Deshpande et al, "Adaptive Query Processing", Foundations and Trends in Databases, vol. 1, No. 1 (2007), pp. 1-140.

Golab et al, "Issues in Data Stream Management", ACM SIGMOD Record, vol. 32, No. 2, Jun. 2003.

Tian et al, "Tuple Routing Strategies for Distributed Eddies", Proceedings of the 29th International Conference on Very Large Databases, vol. 29, Berlin, Germany, VLDB Endowment, 2003.

Sotiropoulos, et al, "LinkViews: An Integration Framework for Relational and Stream Systems", In BIRTE Workshop, Int. Conf. on VLDB, published at http://birte2013.cs.aau.dk/files/Sotiropoulos.pdf (Sep. 2013).

Splunk, Inc., "Splunk DB Connect Fact Sheet", published on World Wide Web at https://www.splunk.com/web_assets/pdfs/secure/Splunk_for_DB_Connect.pdf, available from https://web.archive.org/web/*/https://www.splunk.com/web_assets/pdfs/secure/Splunk_forDB_Connect_pdf (archived on Sep. 24, 2015, original publication date unknown).

Laxman et al., "Stream Prediction Using a Generative Model Based on Frequent Episodes in Event Sequences", KDD '08, Las Vegas, Nevada, USA, Aug. 27, 2008, ACM 978-1-60558-193—Apr. 8, 2008, pp. 453-461.

International Business Machines Corporation, "List of IBM Patents or Patent Applications Treated as Related", filed in USPTO in present application herewith.

"Projecting Effect of In-Flight Streamed Data on a Relational Database", U.S. Appl. No. 15/339,772, filed Oct. 31, 2016.

"Querying In-Flight Streamed Data from a Relational Database", U.S. Appl. No. 15/339,800, filed Oct. 31, 2016.

* cited by examiner

ALTERING IN-FLIGHT STREAMED DATA FROM A RELATIONAL DATABASE

CROSS-REFERENCE TO RELATED APPLICATIONS

This application is a continuation of copending U.S. patent application Ser. No. 15/339,819, filed Oct. 31, 2016, entitled "Altering In-Flight Streamed Data from a Relational Database", which is herein incorporated by reference.

The present application is also related to commonly assigned U.S. patent application Ser. No. 15/339,772, entitled "Projecting Effect of In-Flight Streamed Data on a Relational Database", filed Oct. 31, 2016, and to commonly assigned U.S. patent application Ser. No. 15/339,800, entitled "Querying In-Flight Streamed Data from a Relational Database", filed Oct. 31, 2016, both of which are herein incorporated by reference.

FIELD

This disclosure generally relates to stream computing, and in particular, to computing applications that receive streaming data and process the data as it is received.

BACKGROUND

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

Modern computer systems may be used to support a variety of applications, but one common use is the maintenance of large relational databases, from which information may be obtained. A large relational database is often accessible to multiple users via a network, any one of whom may query the database for information and/or update data in the database.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

Stream-based computing, also called data streaming, has been used to more effectively handle large volumes of incoming data in real time. In a data streaming application, data moves through a connected network of "processing elements" called a "graph", each processing element performing some function or functions with respect to the data.

Many data streaming applications produce data which is ultimately integrated with a relational database, i.e., it becomes new or updated entries in one or more tables in a relational database. Due to the capability of a data streaming application to handle large volumes of data, there could be a large number of new or updated entries in a database table, so large that it could be significant in comparison to data already in the table.

Conventional database query and other management techniques take no account of data which is likely to change in the near future, and in particular, of in-flight data in a streaming application which may affect the future character of the database. This may cause query results to be obsolete or misleading, or may cause certain management decisions or actions to be based on stale information.

A need exists, not necessarily recognized, for improved database management techniques which take account of future database changes, and in particular, which take account of in-flight data in a data streaming application that will or is likely to become part of the database.

SUMMARY

A data streaming application provides input to a database. A database command which alters database data can be extended to alter in-flight streamed data of the data streaming application.

In one or more embodiments, a data streaming application produces data tuples as output, which are entered into at least one table of a relational database. A database user can edit or delete tuples in the database, either individually or by submitting modify data commands to apply to multiple tuples meeting some specified logical parameters. A user may optionally define the scope of a modify data command to include in-flight data in the data streaming application. If the command scope includes in-flight data, the database manager transmits the command to the data streaming application. Responsive to receiving the command, a database agent within a stream manager of the data streaming application invokes one or more database agents residing within the computer system or systems supporting the streaming application. The database agents identify in-flight data tuples held in one or more buffers of the data streaming application which meet the specified logical parameters of the command, and apply the modify data operation (e.g. delete or edit) to any such tuples.

In one or more embodiments, the stream manager uses operator graph profile data, which may be acquired by tracing or otherwise, to determine likely paths of data tuples through an operator graph of the data streaming application and select nodes to be searched for tuples meeting the logical parameters of the command.

By including in-flight data within the scope of a modify data command, a database system can reduce unnecessary processing of streamed data and/or apply changes to streamed data in a more timely manner, thereby improving the efficiency of the database and/or data streaming application.

The details of the present invention, both as to its structure and operation, can best be understood in reference to the accompanying drawings, in which like reference numerals refer to like parts, and in which:

DETAILED DESCRIPTION

Streams Processing Overview

Figure 1:
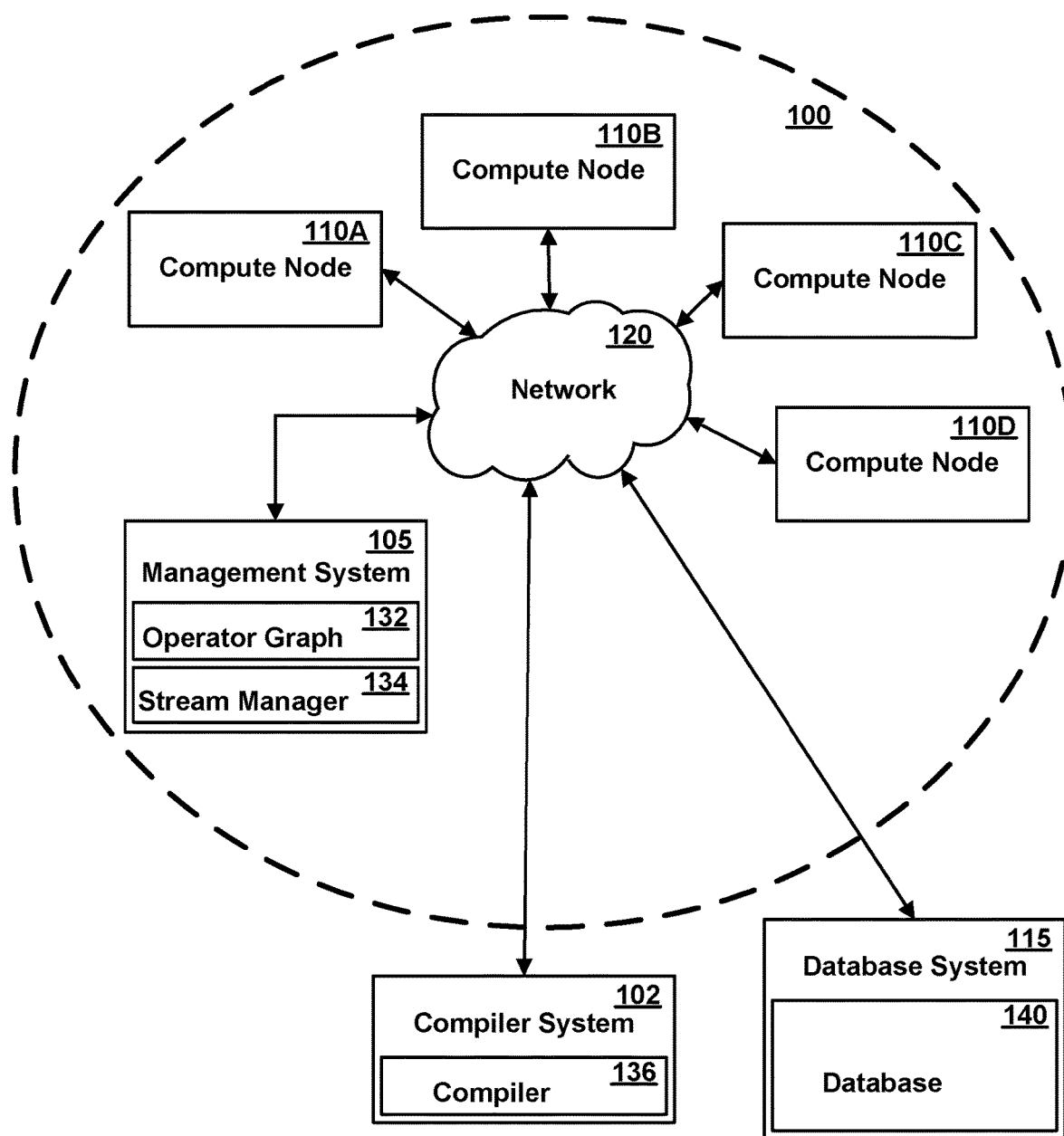
FIG. 1 illustrates a computing infrastructure configured to execute a stream computing application according to various embodiments.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may or may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

FIG. 1 illustrates one exemplary computing infrastructure 100 that may be configured to execute a stream computing application, according to some embodiments. The computing infrastructure 100 includes a management system 105 and two or more compute nodes 110A-110D (herein generically referred to as feature 110)—i.e., hosts—which are communicatively coupled to each other using one or more communications networks 120. The communications network 120 may include one or more servers, networks, or databases, and may use a particular communication protocol to transfer data among compute nodes 110. A compiler system 102 may be communicatively coupled with the management system 105 and the compute nodes 110 either directly or via the communications network 120. Additionally, a database system 115 containing a database 140 may be communicatively coupled to network 120 for communication with management system 105 and/or compute nodes 110.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Computer System Hardware Components

Figure 2:
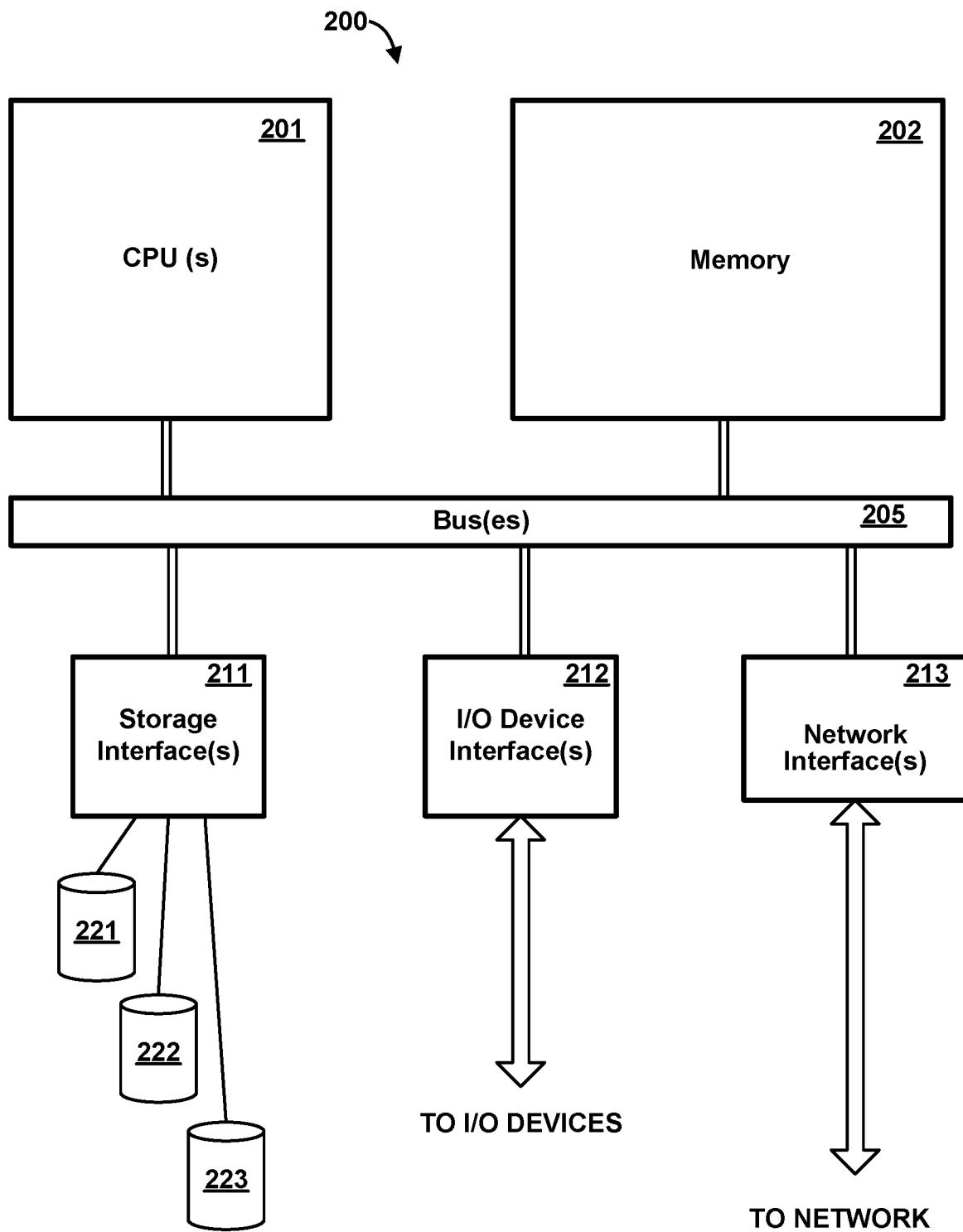
FIG. 2 is a high-level block diagram of the major hardware components of a representative general purpose computer system which could be used to perform the role of any of several functional elements, according to various embodiments.

FIG. 2 is a high-level block diagram of the major hardware components of a representative general purpose computer system 200. In one or more embodiments, compiler system 102, management system 105, compute nodes 110, and database system 115 are each physically embodied as respective one or more general purpose computer systems, system 200 being a representation of any such general purpose computer system.

Computer system 200 includes one or more general-purpose programmable processors (CPU) 201 which execute instructions and process data from main memory 202. Main memory 202 is preferably a volatile random access memory comprising at least one, and typically multiple, semiconductor integrated circuit chip modules, using any of various memory technologies, in which data is loaded from storage or otherwise for processing by CPU(s) 201.

One or more communications buses 205 provide a data communication path for transferring data among CPU(s) 201, main memory 202 and various interface units 211, 212, 213, which may also be known as I/O processors (IOPs) or I/O adapters (IOAs). The interface units support communication with a variety of storage, I/O devices, and/or networks. For example, storage interface unit(s) 211 supports the attachment of one or more storage devices 221-223 providing non-volatile storage of data which can be loaded into memory as required. Such storage devices may include well-known rotating magnetic hard disk drive storage devices, solid state devices (SSD), removable memory cards, optical storage, flash memory, and so forth, and could further include network attached storage (NAS), devices attached via a storage area network (SAN), and/or arrays of disk drives and/or other storage devices configured to appear as a single large storage device to a host. Storage may further include cloud storage devices accessible via one or more networks. I/O device interface unit(s) 212 may support the attachment of any of various other types of I/O devices, such as user terminals, displays, keyboards or other input devices, printers, and so forth, it being understood that other or additional types of I/O devices could be used. Network interface adapter(s) 213 may support connections to one or more external networks for communication with one or more other digital devices, and specifically to network 120 for communication with devices represented in FIG. 1. Network adapter(s) 213 could support redundant connections to a single network, or could be coupled to separate networks, which may or may not be in communication with each other. Such external networks preferably include the Internet, and may include one or more intermediate networks, such as local area networks, through which communication with the Internet is effected.

It should be understood that FIG. 2 is intended to depict the representative major components of general purpose computer system 200 at a high level, that individual components may have greater complexity than represented in FIG. 2, that components other than or in addition to those shown in FIG. 2 may be present, that the number, type and configuration of such components may vary, and that a complex computer system will typically have more components than represented in FIG. 2. Several particular examples of such additional complexity or additional variations are disclosed herein, it being understood that these are by way of example only and are not necessarily the only such variations.

Although only a single CPU 201 is shown for illustrative purposes in FIG. 2, computer system 200 may contain multiple CPUs, as is known in the art. Although main memory 202 is shown in FIG. 2 as a single monolithic entity, memory 202 may in fact be distributed and/or hierarchical, as is known in the art. For example, memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures Although communications buses 205 are shown in FIG. 2 as a single entity, in fact communications among various system components is typically accomplished through a complex hierarchy of buses, interfaces, and so forth, in which higher-speed paths are used for communications between CPU(s) 201 and memory 202, and lower speed paths are used for communications with I/O interface units 211-213. Buses 205 may be arranged in any of various forms, such as point-to-point links in hierarchical, star or web configurations, multiple hierarchical buses, parallel and redundant paths, etc. For example, as is known in a NUMA architecture, communications paths are arranged on a nodal basis. Buses may use, e.g., an industry standard PCI bus, or any other appropriate bus technology. While multiple I/O interface units are shown which separate buses 205 from various communications paths running to the various I/O devices, it would alternatively be possible to connect some or all of the I/O devices directly to one or more system buses. Although FIG. 1 represents network 120 as a single entity, in one or more embodiments a separate network or storage bus may be present for communicating with one or more shared storage servers, and such communication may be driven by a dedicated one or more storage interface units 211 separate from general purpose network adapters 213.

Computer system 200 depicted in FIG. 2 may include multiple attached terminals, such as might be typical of a multi-user "mainframe" computer system. Where computer system 200 is used exclusively as a compute node 110 or other server for performing work on behalf of remote clients, it may contain only a limited number of terminals, or even a single terminal, e.g., for use as a maintenance interface by a system administrator or the like, or in some cases no terminal at all, administrative functions being performed remotely. Furthermore, while certain functions are described herein for illustrative purposes as embodied in a single computer system, some or all of these functions could alternatively be implemented using a distributed network of computer systems in communication with one another, in which different functions or steps described herein are performed on different computer systems.

Although compute nodes 110, management system 105, compiler system 102, and database system 115 are represented in FIGS. 1-2 as independent systems, any or all of these entities may be implemented as corresponding logical partitions of one or more logically partitioned computer systems. For example, any of CPUs 201 may in fact be a corresponding portion of a processing resource capacity of a larger logically partitioned computer system which is allocated to the corresponding logical partition; and any memory 202 may in fact be a corresponding portion of a memory capacity of a larger logically partitioned computer system which is allocated to the corresponding logical partition.

While various system components have been described and shown at a high level, it should be understood that a typical computer system contains many other components not shown, which are not essential to an understanding of the present invention.

Stream Computing Components

Figure 3:
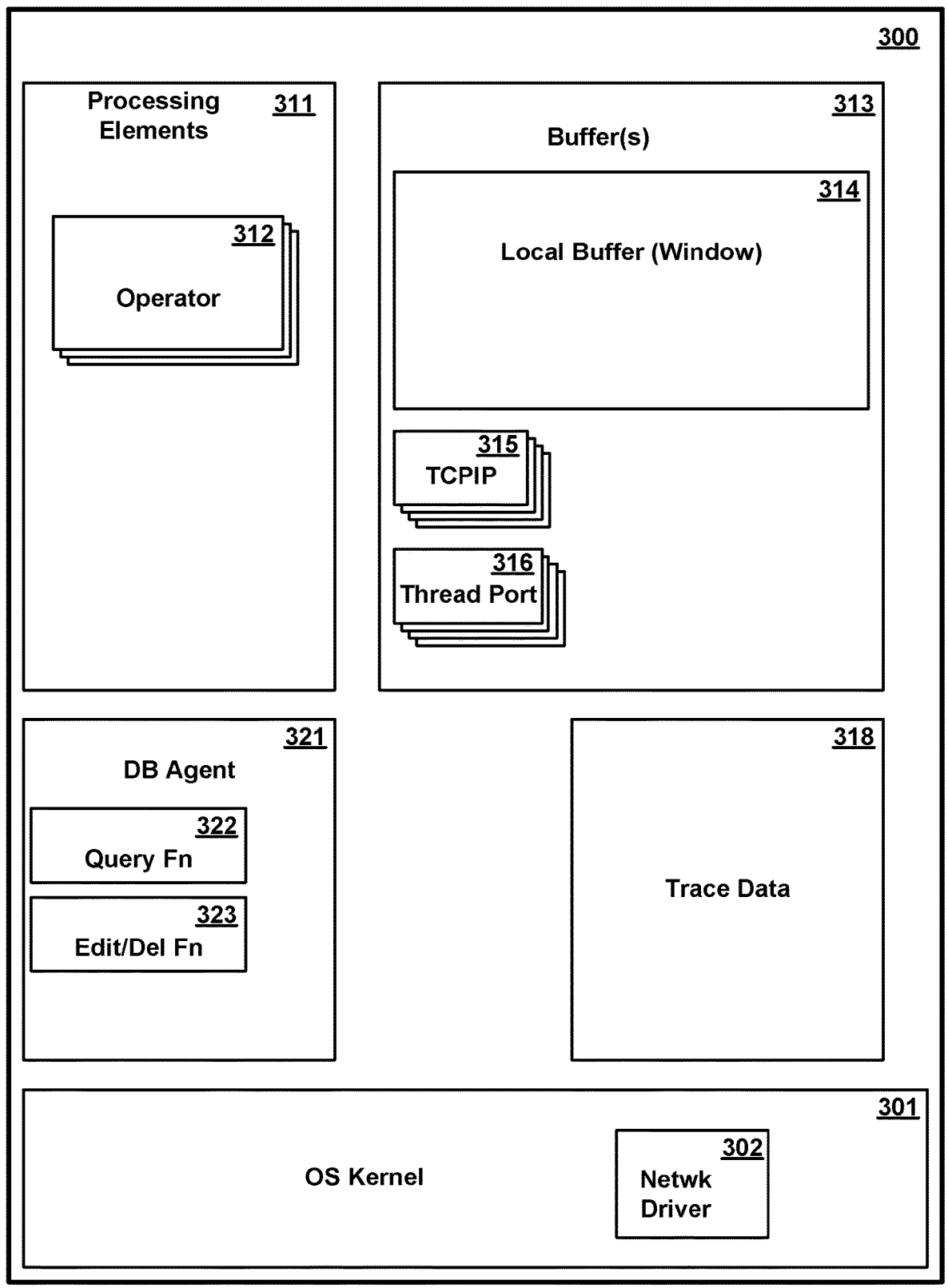
FIG. 3 is a conceptual illustration of certain software components in memory of a compute node of FIG. 1, according to various embodiments.

FIG. 3 is a conceptual illustration showing in greater detail certain software components in memory 300 of a compute node 110, which may be the same as one of the compute nodes 110A-110D of FIG. 1, according to various embodiments. As shown in FIG. 3, a representative compute node memory includes an operating system kernel 301, one or more processing elements 311, a buffer 313, and a compute node database agent 321.

Operating system kernel 301 is executable code and state data providing various low-level software functions, such as device interfaces, management of memory pages, management and dispatching of multiple tasks, common services for application programs, etc. as is well known in the art. In particular, OS kernel 301 preferably includes one or more network adapter drivers 302 for handling communications with one or more networks, including network 120, via network interface(s) 213.

The one or more processing elements 311 each comprise code and state data for performing respective functions as part of a data stream computing application. A stream computing application may include one or more stream operators 312 that may be compiled into a "processing element" container 311. The memory 300 may include two or more processing elements 311, each processing element having one or more stream operators 312. Each stream operator 312 may include a portion of code that processes tuples flowing into a processing element and outputs tuples to other stream operators 312 in the same processing element, in other processing elements, or in both the same and other processing elements in a stream computing application. Processing elements 311 may pass tuples to other processing elements that are on the same compute node 110 or on other compute nodes that are accessible via communications network 120. For example, a processing element 311 on compute node 110A may output tuples to a processing element 311 on compute node 110B. In one embodiment, a processing element 311 is assigned to be executed by only one CPU, although in other embodiments the stream operators 312 of a processing element 311 may include multiple threads which may be executed on different respective CPUs.

Buffer 313 is a portion of memory 300 for holding data being streamed as part of the stream computing application, and in particular, for holding data tuples. Buffer 313 may be a single entity, but in one or more embodiments, multiple buffers exist including a local buffer 314 also known as a window, one or more TCPIP buffers 315 for passing messages among various entities of the data streaming application, and one or more thread ports 316 for queuing data to be processed be respective one or more threads.

Figure 4:
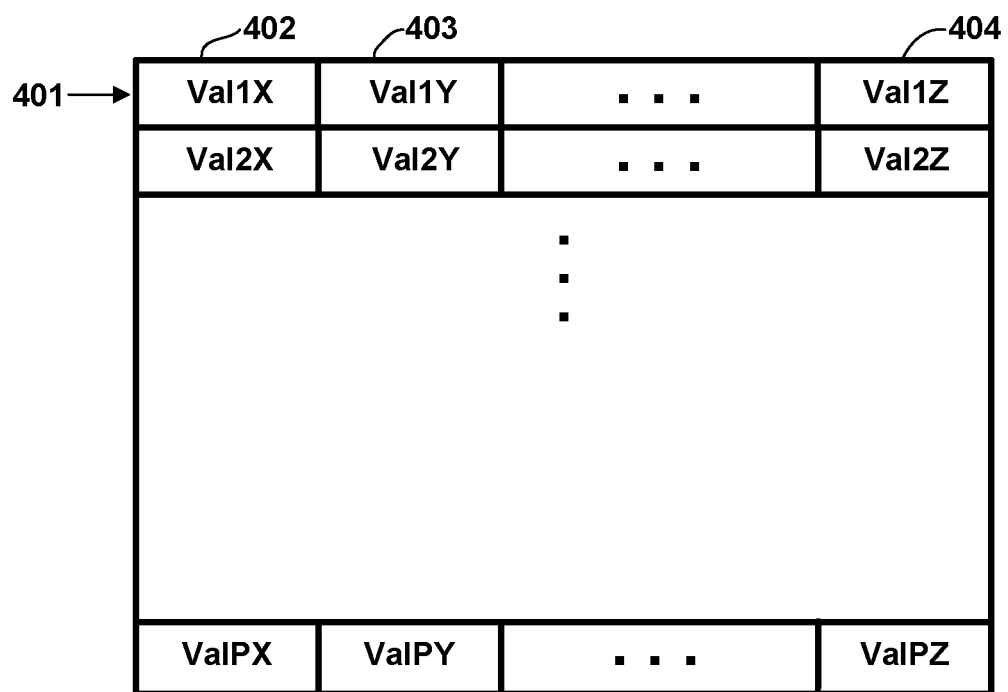
FIG. 4 is a conceptual representation of a set of tuples in a streaming data application buffer, according to various embodiments.

FIG. 4 is a conceptual representation of a set of tuples in a streaming data application buffer 313, according to various embodiments. Any of buffers 314-316 may hold one or more tuples. As illustrated in FIG. 4, a set of tuples contains one or more tuples 401, each tuple logically organized as multiple fields or attributes 402-404. A set of tuples may be conceptually represented as a table, in which each tuple 401 corresponds to a respective row of the table, and each attribute or field of a tuple corresponds to a respective column of the table. Although conceptually represented as a table, the actual structure of a set of tuples in memory may vary, and may be different in each of the different buffers 314-316; the set may occupy non-contiguous memory address regions, tuples may vary in size; some attributes might be present in only a subset of the tuples, and so forth. Although the data streaming application produces tuples which are added to a table of a database, the structure and attributes of tuples 401 within the data streaming application are not necessarily identical to those of tuples in a table of a relational database. The tuples 401 stored in buffer 313 may be all of a single type (i.e., all have the same attributes and structure), or may be tuples of different types. In one or more embodiments, tuples may be grouped separately in separate sets or in different buffers depending on current status of a tuple within the operator graph. For example, one set of tuples may comprise tuples 401 awaiting processing by a particular processing element 311 within the compute node while another set comprises tuples 401 which have already been processed by the particular processing element Compute node database agent 321 is executable code and state data which performs certain functions on behalf of a requesting entity with respect to data in the data streaming application, and in particular, with respect to tuples 315 temporarily stored in buffer 313, as explained in greater detail herein. In general, compute node database agent performs functions which enable a relational database to access streaming data. In one or more embodiments, the requesting entity is a management system database agent 521 executing in management system 105, although the requesting entity could alternatively be a relational database itself. In one or more embodiments, compute node database agent 321 includes a query function 322 for executing queries on behalf of a requesting entity against data in buffer 313 and returning query results to the requesting entity. In one or more embodiments, compute node database agent 321 includes an edit/delete function which performs edit and/or delete operations on data in buffer 313 on behalf of a requesting entity. Database agent 321 may include other or additional functions.

In one or more embodiments, compute node memory 300 may further include trace data 318 tracing operation of the data streaming application, and particularly tracing the progression of tuples through the operator graph. This trace data may be used to build operator graph profile data for use in projecting tuples exiting the data streaming application and entering database 140.

Figure 5:
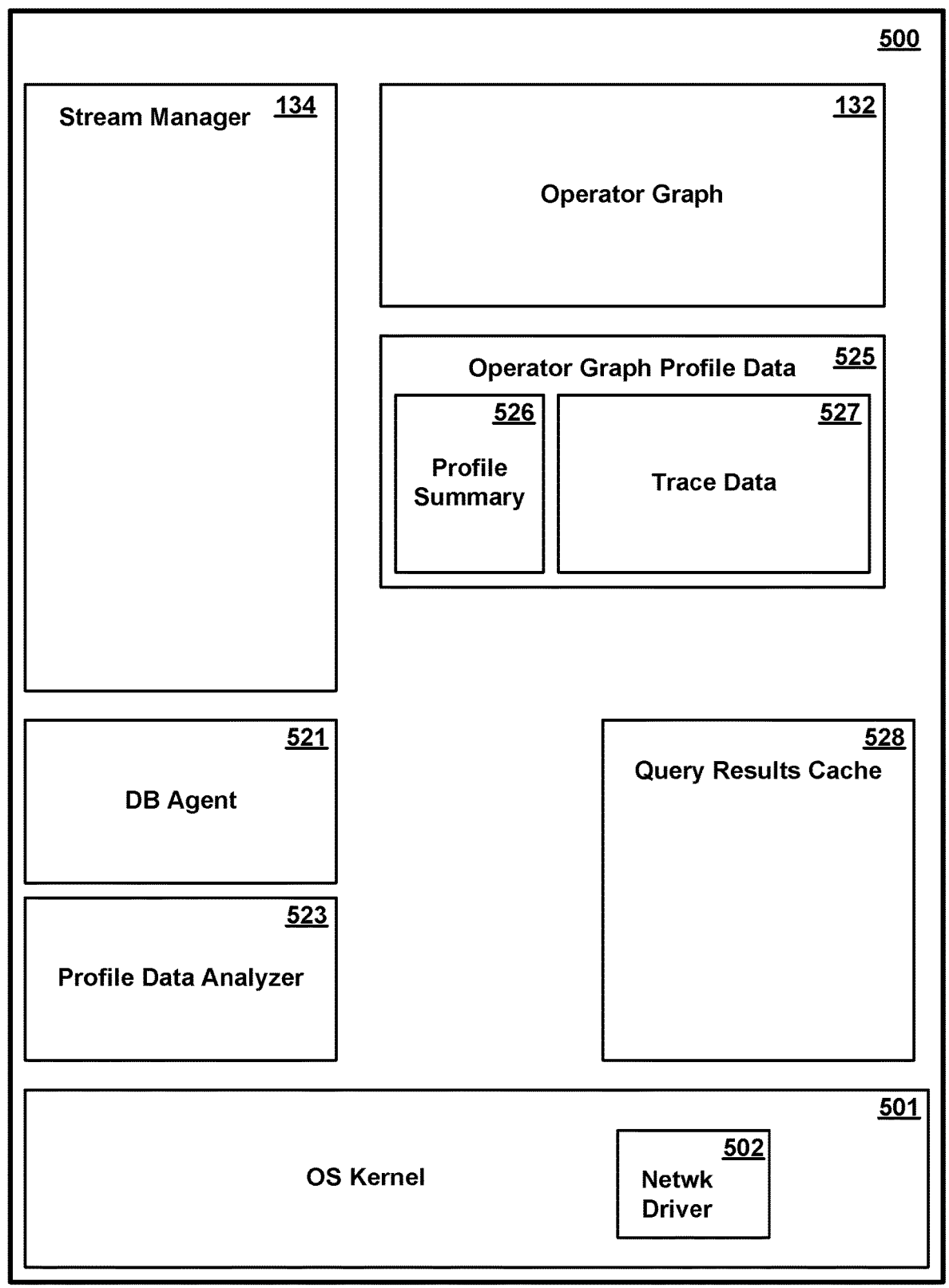
FIG. 5 is a conceptual illustration of certain software components in memory of the management system of FIG. 1 according to various embodiments.

FIG. 5 is a conceptual illustration showing in greater detail certain software components in memory 500 of the management system 105 of FIG. 1 according to various embodiments. As shown in FIG. 5, a representative management system memory includes an operating system kernel 501, a stream manager 134, an operator graph 136, a management system database agent 521, a profile data analyzer 523, operator graph profile data 525, and a query results cache 528.

Operating system kernel 501 is executable code and state data providing various low-level software functions, such as device interfaces, management of memory pages, management and dispatching of multiple tasks, common services for application programs, etc. as is well known in the art. In particular, OS kernel 501 preferably includes one or more network adapter drivers 502 for handling communications with one or more networks, including network 120, via network interface(s) 213.

Stream manager 134 manages the operation of the data streaming application, and in particular, maintains operator graph 132. Operator graph 132 is a data structure defining how tuples are routed to processing elements 311 for processing.

Management system database agent 521 is executable code and state data which performs certain database related functions with respect to data in the data streaming application at the request of a relational database. These database related functions may involve access to data in the buffers 313 of one or more compute nodes 110, for which management system database agent 521 communicates with corresponding compute node database agents 321 in the respective one or more compute nodes 110. Management system database agent 521 may receive result data from the various compute node database agents 321, may collect and process result data in query results cache 528, and provide collected and processed results back to the requesting database. In one or more embodiments, management system database agent 521 performs certain operations, and in particular projects streamed data to enter the relational database, using operator graph profile data 525.

Figure 12:
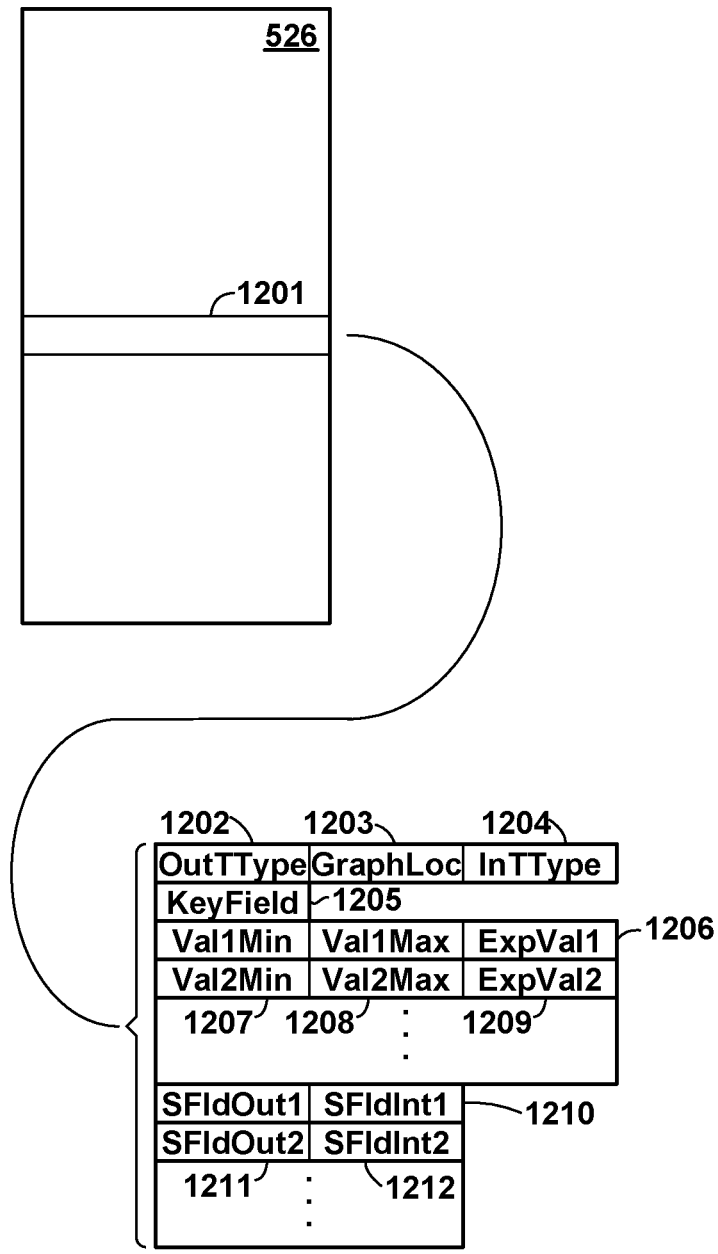
FIG. 12 is a conceptual illustration of the structure of an exemplary set of profile summary records, according to various embodiments.

Profile data analyzer 523 is executable code and state data which collects trace data from the various compute nodes and analyzes that data to construct and maintain operator graph profile data 525. Operator graph profile data 525 includes profile summary records 526 and trace data 527. Trace data 527 is a collection of all or selective portions of trace data 318 from the various compute nodes, and is used to by profile data analyzer to generate profile summary records 526. Profile summary records are a representation of historical data streaming flow patterns. For example, profile summary records may represent a number, proportion or other measure of tuples entering and leaving each processing element, attributes within tuples which are changed, deleted or added by each processing element, and so forth. Tuple data flow may further be represented separately for different attribute key values within a tuple. Exemplary profile summary data 526 is illustrated in FIG. 12 and described in greater detail herein.

Figure 6:
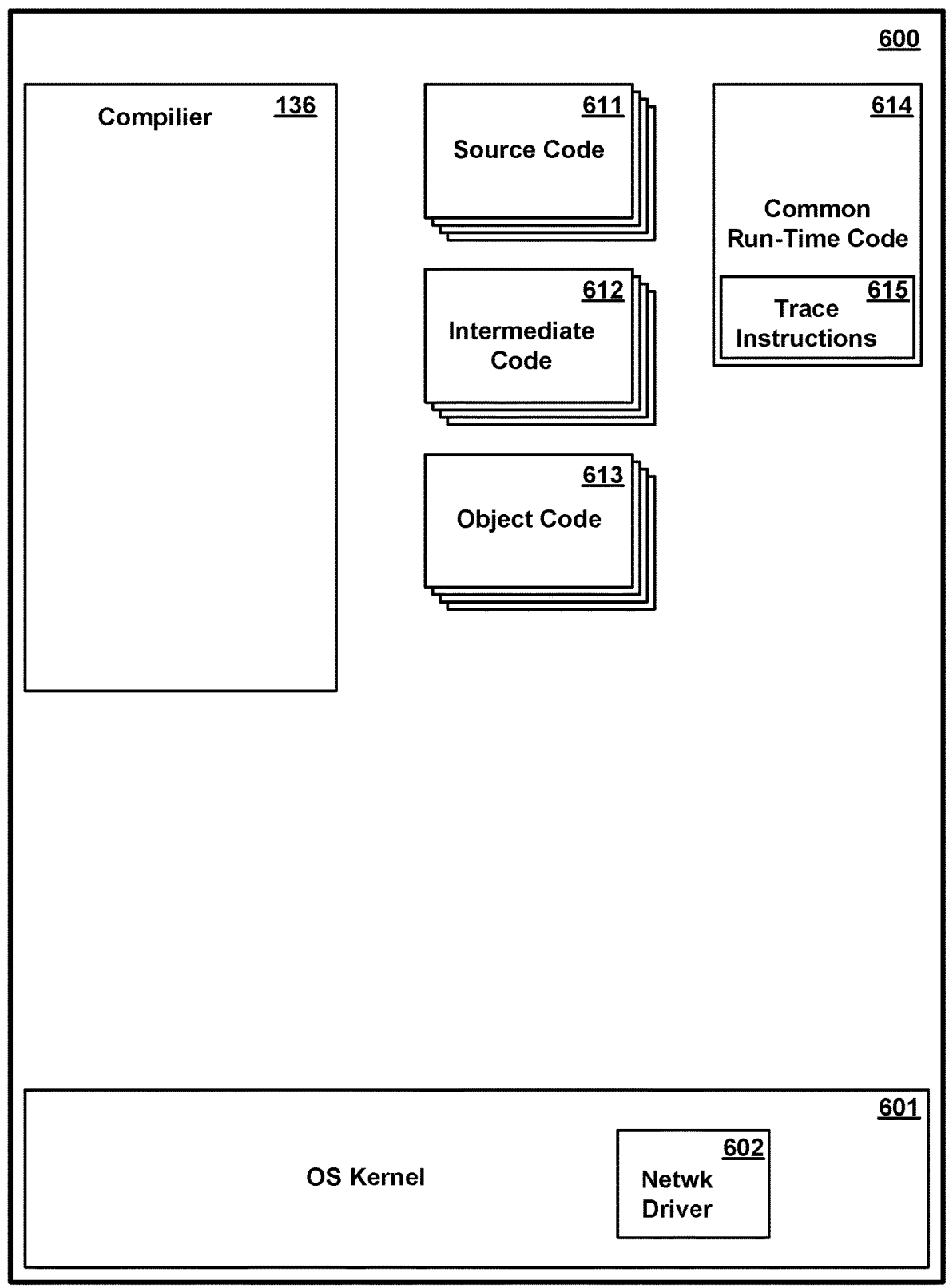
FIG. 6 is a conceptual illustration of certain software components in memory of the compiler system of FIG. 1 according to various embodiments.

FIG. 6 is a conceptual illustration showing in greater detail certain software components in memory 600 of the compiler system 102 of FIG. 1 according to various embodiments. As shown in FIG. 6, a representative compiler system memory includes an operating system kernel 601, a compiler 136, and compiler input and output in the form of source modules 611, intermediate code modules 612, and object code modules 613.

Operating system kernel 601 is executable code and state data providing various low-level software functions, such as device interfaces, management of memory pages, management and dispatching of multiple tasks, common services for application programs, etc. as is well known in the art. In particular, OS kernel 601 preferably includes one or more network adapter drivers 602 for handling communications with one or more networks, including network 120, via network interface(s) 213.

Compiler 136 is executable code and data structures which compiles modules, which include source code or statements 611, into the object code 613, which includes machine instructions that execute on a processor. In one embodiment, the compiler 136 may translate the modules into an intermediate form 612 before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, interprocedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 132.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Compiler system memory 600 further includes common run-time code 614. Common run-time code can be any of source code, intermediate code, or object code. Common run-time code 614 is common code which is included in the code of each processing element 311 to perform functions common to all or many processing elements. Common run-time code may include, for example, functions for passing messages among the various processing elements, accessing buffer 313, reporting errors or other status, and so forth. In one or more embodiments, common run-time code includes trace instructions 615 for collecting trace data 318 tracing operation of the data streaming application. Trace data 318 collected by executing trace instructions 615 may be used for building operator graph profile data 525. Trace instructions 615 may be optionally included instructions, i.e., instructions which the compiler 136 optionally includes in the code of a processing element depending on the settings or directions given to the compiler at time of compilation.

Figure 7:
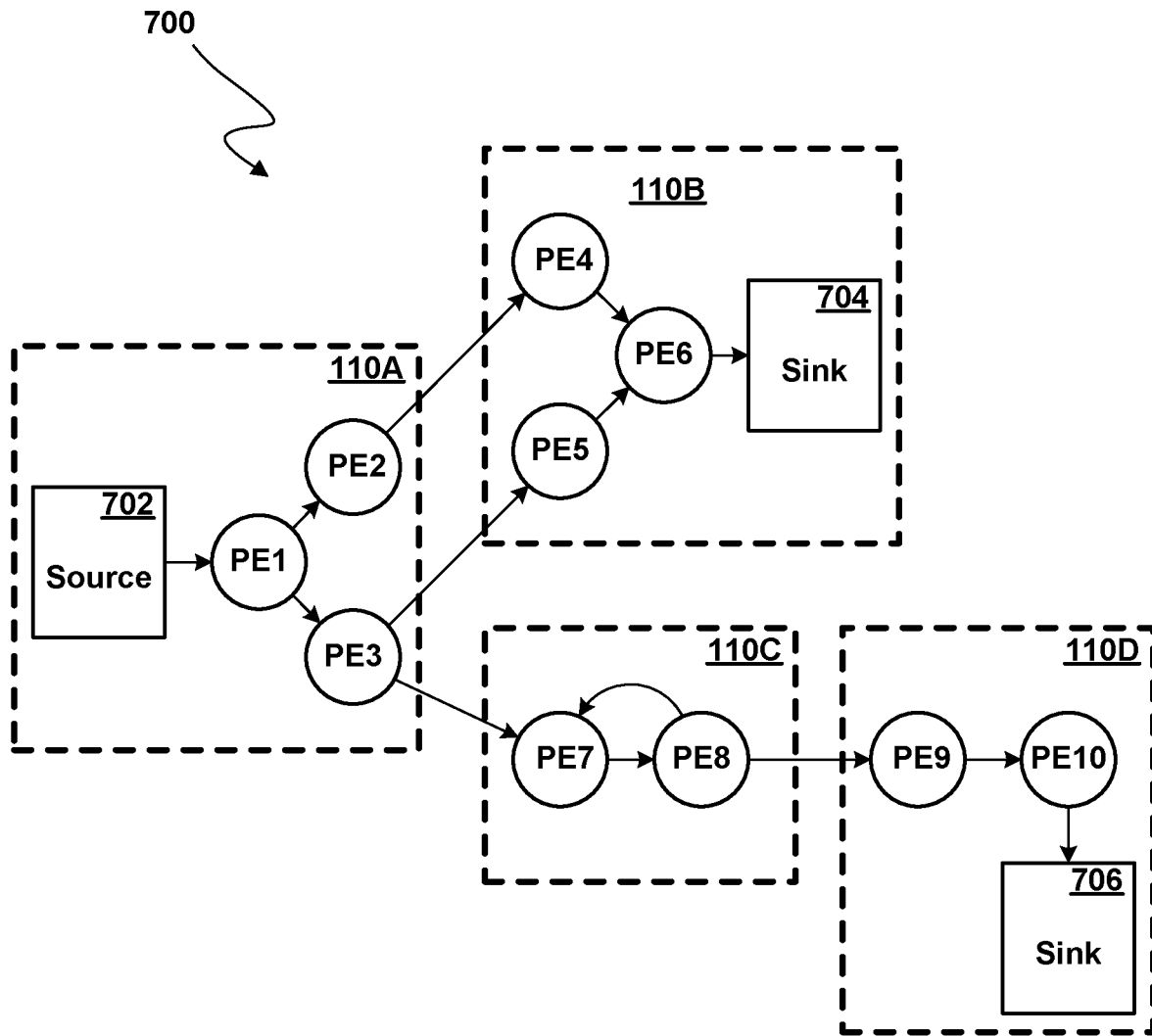
FIG. 7 illustrates an operator graph for a stream computing application according to various embodiments.

FIG. 7 illustrates an exemplary operator graph 700 for a stream computing application beginning from one or more sources 702 through to one or more sinks 704, 706, according to some embodiments. This flow from source to sink may also be generally referred to herein as an execution path. In addition, a flow from one processing element to another may be referred to as an execution path in various contexts. Although FIG. 7 is abstracted to show connected processing elements PE1-PE10, the operator graph 700 may include data flows between stream operators 312 (FIG. 3) within the same or different processing elements. Typically, processing elements, such as processing element 311 (FIG. 3), receive tuples from the stream as well as output tuples into the stream (except for a sink—where the stream terminates, or a source—where the stream begins). While the operator graph 700 includes a relatively small number of components, an operator graph may be much more complex and may include many individual operator graphs that may be statically or dynamically linked together.

The example operator graph shown in FIG. 7 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 700 begins at a source 702 and ends at a sink 704, 706. Compute node 110A includes the processing elements PE1, PE2, and PE3. Source 702 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 704. Similarly, tuples flowing from PE3 to PE5 also reach the operators in sink PE6 704. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 706. Typically, the sinks 704, 706 output data (e.g. tuples) externally of the data streaming application (e.g., to a database, storage file, or other destination); however, it is possible for any of the processing elements to output data externally as well.

Processing elements 311 (FIG. 3) may be configured to receive or output tuples in various formats, e.g., the processing elements or stream operators could exchange data marked up as XML documents. Furthermore, each stream operator 312 within a processing element 311 may be configured to carry out any form of data processing functions on received tuples, including, for example, writing to database tables or performing other database operations such as data joins, splits, reads, etc., as well as performing other data analytic functions or operations.

The stream manager 134 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 7 illustrates execution paths between processing elements for the sake of clarity.

Database Components

Figure 8:
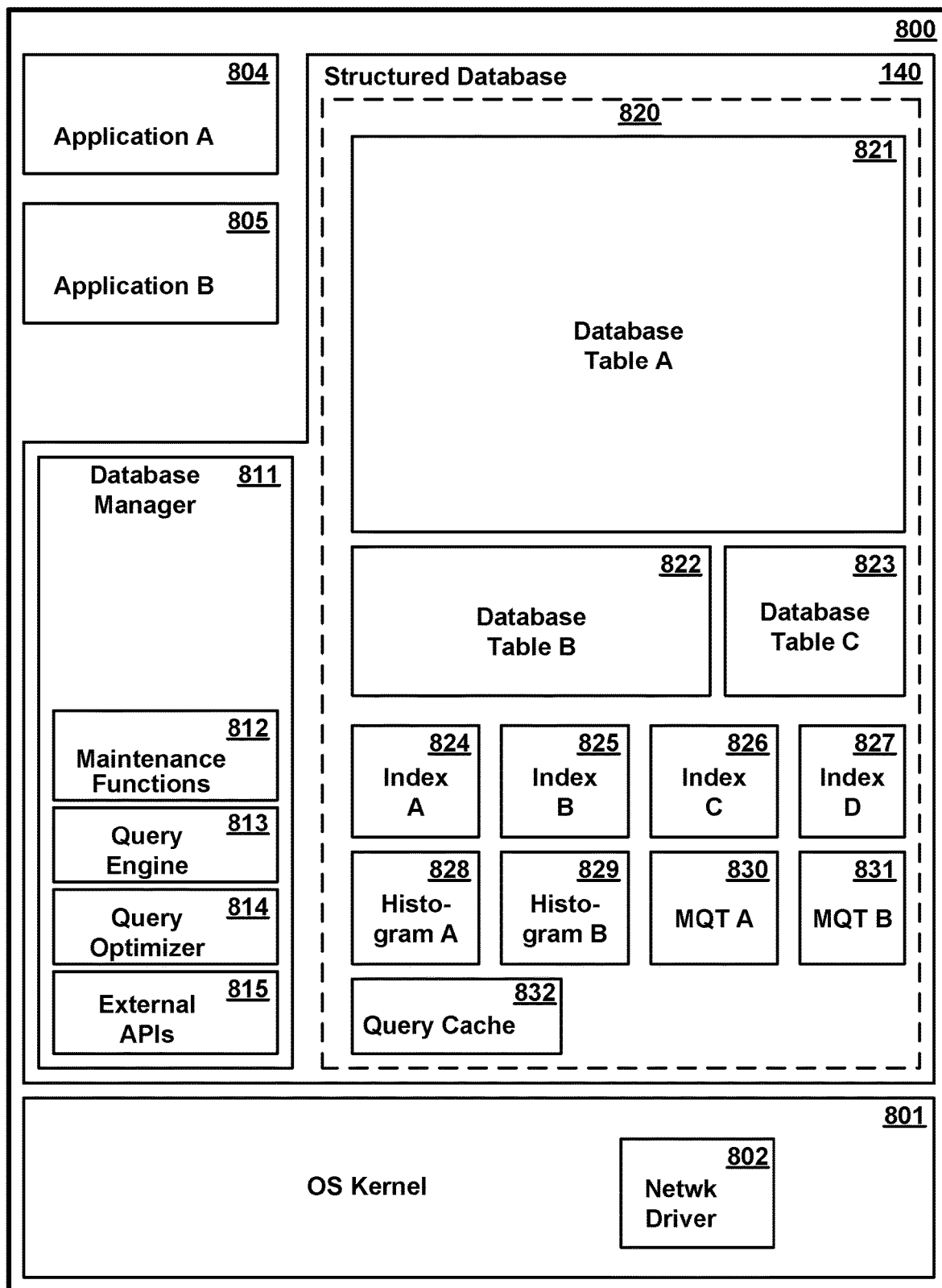
FIG.8 is a conceptual illustration of the major software components in memory of a database server computer system, according to various embodiments.

In accordance with one or more embodiments, tuples output by operator graph 700, whether from one of sinks 704, 706, or from some other processing element, are entered into one or more tables of a structured relational database 140. FIG.8 is a conceptual illustration of the major software components in memory 800 of a database server computer system 115 of FIG. 1 for accessing a structured relational database 140, according to various embodiments. As shown in FIG. 8, a database server computer system memory contains an operating system kernel 801 and structured database 140 including a database manager 811, one or more database tables 821-823, and one or more metadata structures 824-832.

Operating system kernel 801 is executable code and state data providing various low-level software functions, such as device interfaces, management of memory pages, management and dispatching of multiple tasks, common services for application programs, etc. as is well known in the art. In particular, OS kernel 801 preferably includes one or more network adapter drivers 802 for handling communications with one or more networks, including network 120, via network interface(s) 213.

Database tables and metadata 820 include one or more tables 821-823 (of which three are shown for illustrative purposes in FIG. 8, it being understood that the number may vary). As is known in the database art, a database table is a data structure logically in the form of a table having multiple records (also called entries or tuples), each record having at least one, and usually multiple, fields (also called attributes). The "rows" of the table correspond to the records, and the "columns" correspond to the fields. Although tables 821-823 are data structures which are logically equivalent to tables, they may be arranged in any suitable structure known in the database art. Database tables 821-823 might contain almost any type of data which is useful to users of a computer system.

Figure 9:
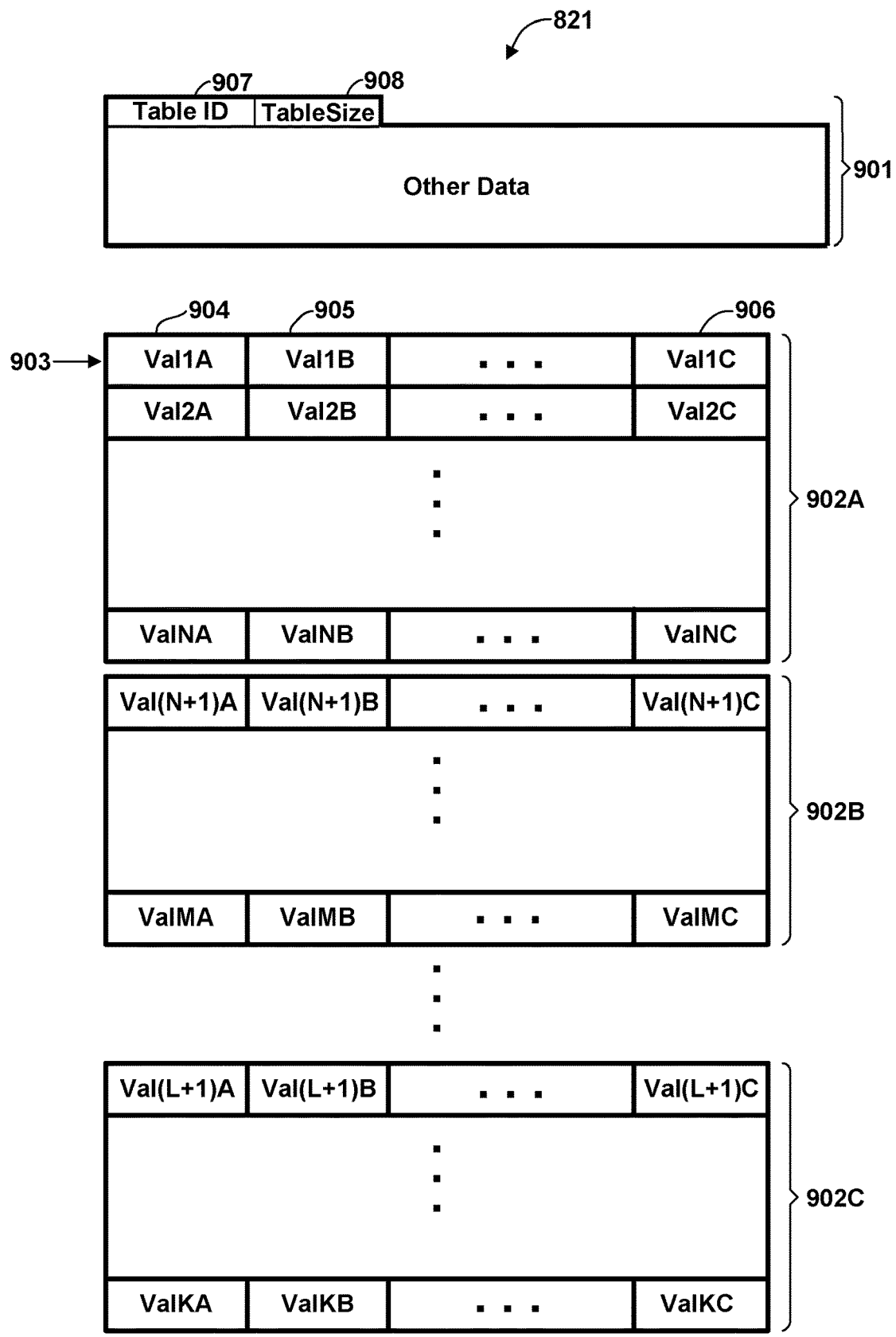
FIG. 9 is a conceptual representation of the structure of a database table, according to various embodiments.

FIG. 9 is a conceptual representation of the structure of a database table 821, according to one or more preferred and/or optional embodiments, it being understood that tables 822, 823 could have similar structure. Referring to FIG. 9, table 821 includes a header portion 901 and one or more table partitions 902A,902B,902C (herein generically referred to as feature 902). Each table partition 902 contains multiple records 903 (also called rows, entries, or tuples), each record 903 containing multiple data values logically organized as multiple fields 904-906. A large database table will typically have multiple partitions 902, each partition containing a respective disjoint subset of the records of the database table as a whole, although smaller tables may have only a single partition. Each database table partition 902 is conceptually represented in FIG. 9 as a table or array, in which the rows represent database records, and the columns represent database fields. However, as is known in the art, the actual structure of the database table in storage may vary due to the needs of data organization accommodating database updates, and so forth. A database table may occupy non-contiguous blocks of storage; database records may vary in length; some fields might be present in only a subset of the database records; and individual entries may be non-contiguous.

Associated with database table 821 is header portion 901. Header 901 is in fact data separate from the collection of records 903, and may be considered part of the database table 821 or may be considered a separate data structure. The header may or may not be stored in locations contiguous to the records 903. Header contains data for identifying the contents of the table, where it is located (e.g., pointers, arrays and other structures which identify the locations of the various partitions 902), certain essential parameters of the table, and so forth. In particular, in accordance with one or more embodiments, header 901 contains a table identifier 907 and a current table size 908 (i.e., the number of record currently in table 821). In accordance with one or more embodiments, the header further contains various other data useful for managing the table.

Associated with the database tables are one or more auxiliary data structures 824-832, also sometimes referred to as metadata (of which nine are represented in FIG. 8, it being understood that the number and type of such structures may vary). Auxiliary data structures characterize the structure of the database and data therein, and are useful in various tasks involved in database management, particularly in executing queries against the database. Examples of auxiliary data structures include database indexes 824-827, histograms 828-829, and materialized query tables (MQT) 830-831). Auxiliary data structures may further include a query cache 832 in which data regarding previously executed queries (the query itself, query execution plan or execution strategy, run-time statistics from execution, etc.) is stored. Although a particular number and type of auxiliary database structures is illustrated in FIG. 8, it will be understood that the number and type of such structures may vary, that not all illustrated structures may be present, and/or that additional structures not shown may be present.

Database manager 811 comprises executable computer programming code which executes on CPU(s) 201 of database server system 115 to provide basic functions for the management of database 140. Database manager 811 may theoretically support an arbitrary number of database tables, which may or may not have related information, although only three tables are shown in FIG. 8. Database manager 811 preferably contains administrative maintenance functions 812 which automatically perform certain functions to manage the database and/or allow authorized users to perform basic administrative operations with respect to the database, such as defining and editing database table definitions, creating, editing and removing records in the database, viewing records in the database, defining database auxiliary data structures such as indexes and materialized query tables, views, and so forth. Administrative functions may further include logging of database transactions, recovery of data, and so forth. Certain of these functions may be available only to system administrators and the like, while others are available to clients.

Database manager 811 preferably further includes a query engine 813 for executing queries against data in database tables 821-823 and a query optimizer 814 for generating optimized query execution plans for use by query engine 813 in executing queries. Database manager 811 further preferably includes an external interface 815 having one or more application programming interfaces (APIs) by which external applications can access data in database 140 either by invoking query engine 813 or through other means. Database manager 811 may further contain any of various more advanced database functions, as are known in the art. Database manager could be a generic database management system, such as one implementing a structured query language (SQL) query protocol, but it might alternatively query and structure data according to some other protocol and/or might be a custom designed database management system. Although database manager 811 is shown and described herein as an entity separate from operating system kernel 801, it will be understood that in some computer architectures various database management functions are integrated with the operating system.

Although one database 140 having three database tables 821-823 and nine auxiliary structures 824-832 are shown in FIG. 8, the number of such entities may vary, and could be much larger. A computer system or a group of computer systems may contain multiple databases, each database may contain multiple tables, and each database may have associated with it multiple indexes, MQTs, histograms, views, volatility records, and/or other auxiliary data structures not illustrated. Alternatively, some entities represented in FIG. 8 might not be present in all databases. Additionally, database 140 may be logically part of a larger distributed database which is stored on multiple computer systems. Although database manager 811 is represented in FIG. 8 as part of database 140, the database manager, being executable code, is sometimes considered an entity separate from the "database", i.e., the data 820.

In addition to operating system 801 and database 140, memory of database system 800 may include all or selective portions of one or more user applications 804-805. User applications 804-805 are applications which execute on CPU(s) 201, and may access data in database 140 to perform tasks on behalf of one or more users. Such user applications may include, e.g., sales transactions, inventory management, personnel records, accounting, code development and compilation, mail, calendaring, or any of thousands of user applications, and may be web-based (i.e., present web pages to a remote client for rendering in the client's browser) or provide some other form of user interface. Some of these applications may access database data in a read-only manner, while others have the ability to update data. There may be many different types of read or write database access tasks, each accessing different data or requesting different operations on the data. For example, one task may access data from a specific, known record, and optionally update it, while another task may invoke a query, in which all records in the database are matched to some specified search criteria, data from the matched records being returned, and optionally updated. Furthermore, data may be read from or written to database tables 811-813 directly, or may require manipulation or combination with other data supplied by a user, obtained from another database, or some other source. Applications 804-805 typically utilize function calls to database manager 811 through external APIs 815 to access data in the database, and in particular, to execute queries against data in the database, although in some systems it may be possible to independently access data in the database directly from the application. Although two applications 804-805 are shown for illustrative purposes in FIG. 8, the number of such applications may vary.

Various software entities are represented conceptually in FIGS. 3-9 as being contained in respective memories of any of the various systems or devices described herein. However, as is well known, the memory of a computer or other digital device is typically insufficient to hold all software entities and other data simultaneously, and selective portions of software entities or other data are typically loaded into memory from storage as required. Furthermore, various software entities are represented in FIGS. 3-9 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representations of FIGS. 3-9, it will be understood that the actual number of such entities may vary, and in particular, that in a complex data streaming and/or database environment, the number and complexity of such entities is typically much larger. Additionally, although certain software components are depicted in within respective single systems for completeness of the representation, it is not necessarily true that all programs, functions and data will be present in a single system, and may be present in another partition on the same computer system or in a different computer system. For example, user applications 804-805 which call APIs to access the database may be on a separate system from certain maintenance functions such as defining the database, adding or deleting metadata structures, and so forth. Finally, it will be understood that the conceptual representations of FIGS. 3-9 are not meant to imply any particular memory organizational model, and that a computer system hosting a data streaming application or a database might employ a single address space virtual memory, or might employ multiple virtual address spaces which overlap.

Collection of Data Streaming Profile Data

In accordance with one or more embodiments, profile data is collected which characterizes the operation of the data streaming application. This profile data is then used to correlate instances of tuples exiting the data streaming application (e.g., via a sink 604,606, or otherwise) to be appended to a database table 821-823 of database 140 with previously occurring tuples in the operator graph. These previously occurring tuples may have specified attribute values and/or exist at specified locations in the operator graph. The analyzed profile data may be used to project data which will be added to the database and/or to execute queries against in-flight data in the data streaming application, as described in commonly assigned U.S. patent application Ser. No. 15/339,772, entitled "Projecting Effect of In-Flight Streamed Data on a Relational Database", filed Oct. 31, 2016, and commonly assigned U.S. patent application Ser. No. 15/339,800, entitled "Querying In-Flight Streamed Data from a Relational Database", filed Oct. 31, 2016, both of which are herein incorporated by reference. However, at least some of this profile data may also be used for executing delete/edit commands against in-flight data, as described herein.

In one or more embodiments, profile data is obtained by tracing the execution of one or more execution instances of the data streaming application, although other or additional forms of profile data might be used, such as input and output data or data obtained from analysis of the source code. Tracing is a well-known technique whereby the occurrence of pre-defined traceable events during execution of a computer program causes the computer to save certain state data showing the state of the computer at the time the traceable event occurred. It is typically used during computer program code development, to debug errors, determine frequently used code paths, identify performance bottlenecks, and so forth.

Tracing may be accomplished by "instrumenting" the code to be traced, i.e., placing trace instructions ("instrumentation") at various code location which, when encountered during execution of the computer program, cause the desired state data to be saved. A trace instruction could cause data to be saves unconditionally (every time the instruction is encountered), or conditionally based on some state value(s). The exact mechanism whereby the state data is saved may vary. The tracing instrumentation could be in-line instructions in the code, or a call to a separate routine, or an instruction which triggers an interrupt.

In one or more embodiments, the trace instructions 615 (instrumentation) are contained in at least one version of the common run-time code 614 used by computer 136 to generate the data streaming program. There could, in fact, be multiple versions of the common run-time code, including one without any instrumentation. There could also be multiple different instrumented versions for collecting different types of profile data. Instrumentation in the common run-time code simplifies the process of developing a data streaming application by avoiding the need for developers of each different data streaming application to create their own instrumentation, and standardizes the collection and analysis of profile data.

The common run-time code 614 typically contains routines in which traceable events occur. Specifically, in one or more embodiments, common run-time code 614 will include routines for allocating a new tuple in the data streaming application, for sending a tuple from one processing element to a next processing element, and for outputting a tuple to the database. Additional routines which may be of interest in tracing tuples in accordance with one or more embodiments may include routines for copying or duplicating a tuple, for deleting a tuple, for changing the definition of a tuple (its fields, field lengths, etc.) and so forth. In one or more embodiments, any or all of these events might be traceable events which cause the collection of trace data, and appropriate instrumentation is placed in the corresponding routines which perform the operation.

Figure 10:
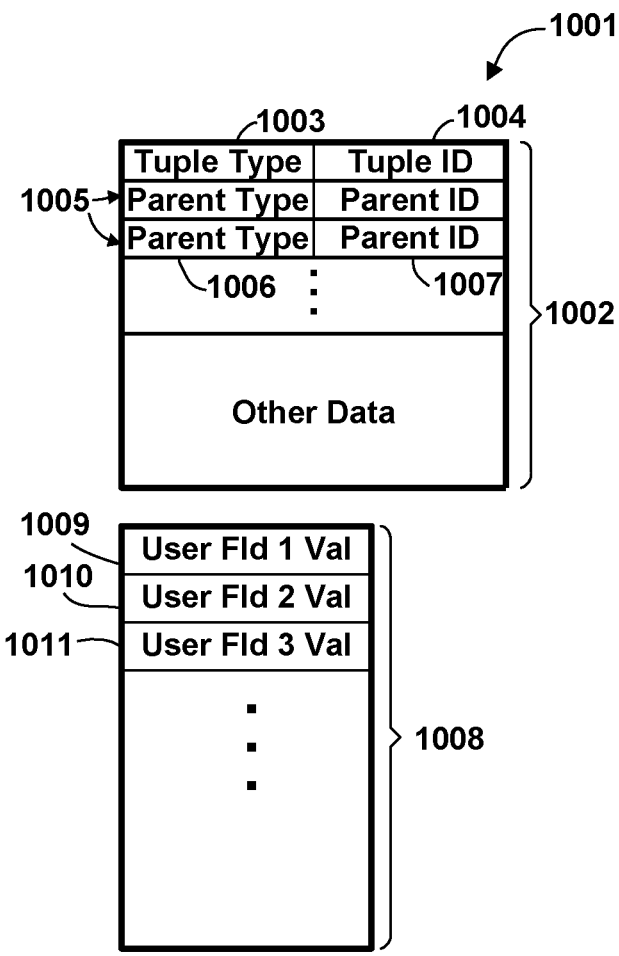
FIG. 10 is a conceptual representation of an altered tuple of a data streaming application altered for supporting profile analysis, according to various embodiments.

In one or more embodiments, the instrumented version(s) of common run-time code 614 alter the structure of the tuples used in the data streaming application by adding additional data useful in trace analysis. FIG. 10 is a conceptual representation of an altered tuple 1001 of a data streaming application, altered for supporting profile analysis of trace data, according to various embodiments. Referring to FIG. 10, tuple 1001 includes a header 1002 containing a tuple type 1003, a unique tuple identifier 1004, and a variable number of parent pairs 1005, each parent pair comprising a respective parent tuple type 1006 and parent tuple identifier 1007. The header may contain other data. The tuple further contains a body portion 1008 having a variable number of user data fields 1009-1011 as defined by the data streaming application, of which three are illustrated in FIG. 10, it being understood that the number of such user data fields may vary. The tuple type 1003 is the name of a set of tuples having a common defined structure, corresponding roughly to a table name of a database table containing multiple tuples (also called records or rows). The tuple identifier 1004 and parent pairs 1005 are additional fields which are added by the instrumented version of the common run-time code 614. These fields are used internally by the data streaming application for trace analysis and/or other purposes, and need not be visible to the user of the application.

In the instrumented version of the common run-time code, any routine which creates a new tuple automatically allocates the above described fields and assigns a unique tuple identifier 1004, similar to a unique serial number, to the newly created tuple. If the newly created tuple is created from or copied from an existing tuple (parent tuple), the tuple type and unique tuple identifier of the parent tuple are copied into a parent pair 1005 of the new tuple as the parent tuple type 1006 and parent tuple identifier 1007, respectively. Since there could be a chain of multiple parents, all parent pairs 1005 in the immediate parent are also copied into respective parent pairs 1005 of the newly created tuple.

Figure 11:
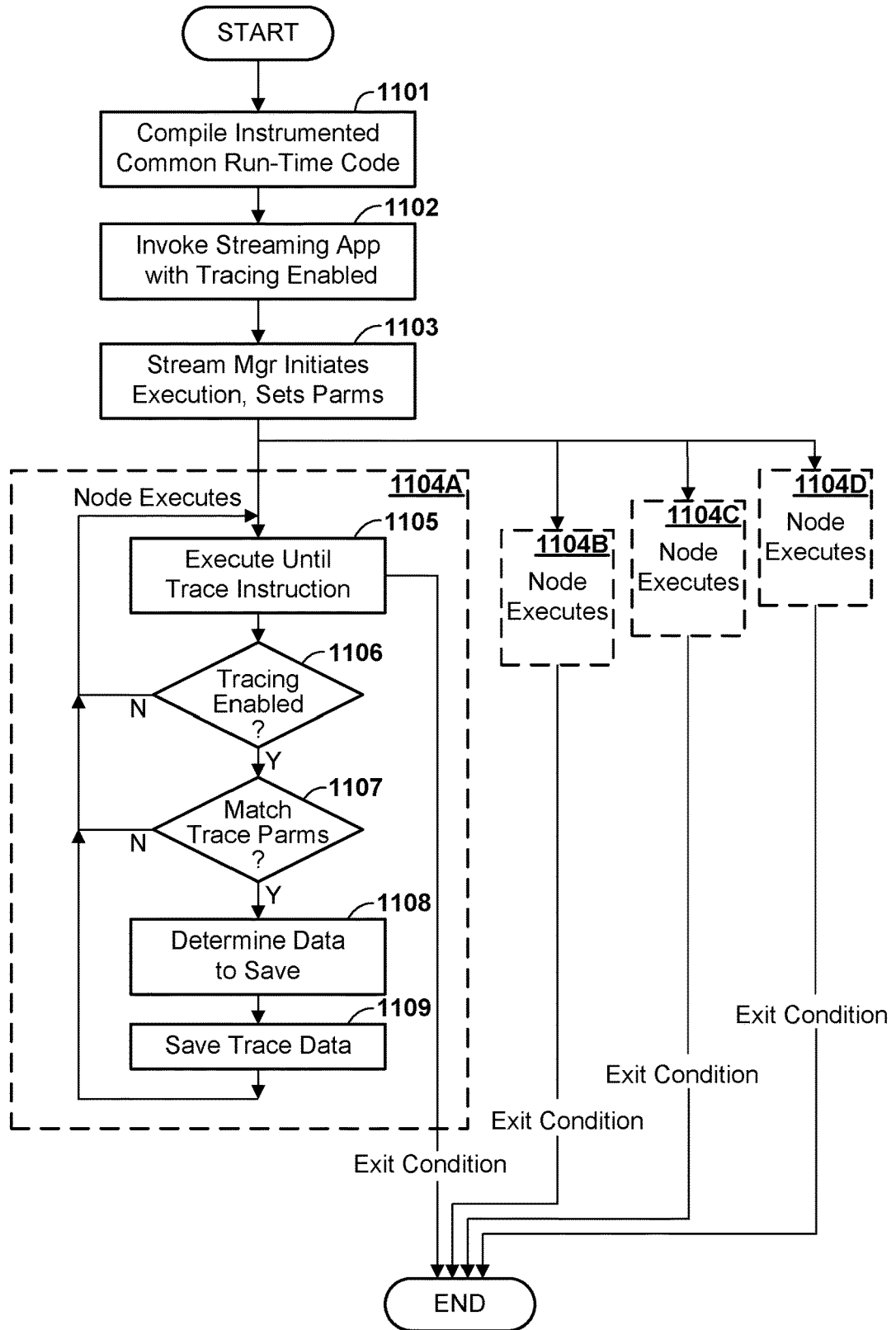
FIG. 11 is a flow diagram illustrating at a high level a process of collecting profile data for a data streaming application, according to various embodiments.

FIG. 11 is a flow diagram illustrating at a high level a process of collecting profile data for a data streaming application, according to various embodiments. Referring to FIG. 11, the instrumented code is compiled by compiler 136 (block 1101). Compilation represented at block 1101 could be either static or dynamic compilation. If statically compiled, the user would direct compilation with instrumentation at compile time, by specifying use of an appropriate instrumented version of the common run-time code, or if supported, by a special compiler directive or option to use the instrumented version. If dynamically compiled at run time, the user invoking execution of the data streaming application specifies the code files (e.g., source or intermediate code) including any instrumented version of the common run-time code. Responsive to the appropriate directive, compiler 136 compiles the data streaming application (either statically or dynamically, as the case may be) to incorporate the tracing instructions.

The data streaming application is invoked for execution with tracing enabled, and any optional tracing parameters are specified (block 1102). Although block 1102 is represented in FIG. 11 as following block 1101, is will be understood that in certain dynamic compilation environments, compilation may occur after the data streaming application is invoked for execution.

In one or more embodiments, the instrumentation instructions, being in the common run-time code, are not specific to any particular data streaming application and therefore not specific to any particular type of tuple or set of tuple types. For example, a common run-time routine which sends a tuple from one processing element to a next processing element could include a tracing instructions which trigger whenever a tuple (of any type) is sent. If the user wishes to trace a particular type of tuple or set of tuple types, the user specifies the tuple(s) to be traced as an optional tracing parameter when the data streaming application is invoked. When the trace instructions are triggered, the code determines whether the tuple being operated on by the corresponding common run-time routine is of the type which should be traced, and saves trace data accordingly. Additional run-time tracing options are possible. For example, it may be desirable to trace only some if the possible traceable events or paths through the operator graph. While generic trace instructions may exist in the common run-time code making it possible to trace all paths through the operator graph, the user may specify particular paths to be traced or otherwise limit the events to be traced.

Accordingly, when the data streaming application is invoked for execution at block 1102, the user may specify any tracing parameters. The user may have the option to disable tracing entirely for performance reasons. To collect trace data for use in analyzing the execution profile of the data streaming application and generating operator graph profile data 525 including profile summary data 526, tracing is preferably enabled and trace data for one or more tuple types of interest is saved whenever a tuple of the corresponding type is created, is sent from one processing element to another, or is output to the database. Additional events may optionally be traced.

Stream manager 134 responds by initiating execution in the various compute nodes 110 and initializing any environmental parameters, including environmental parameters governing tracing (block 1103). For example, a trace enable flag may be set, and bit masks or other data structures may be initialized to control tracing for the desired events to be traced, trace data to be collected, and so forth.

The data streaming application executes concurrently in each of the compute nodes 110 and in the management system 105, represented in FIG. 11 as blocks 1104A-D. Actions within each node or management system are illustrated only in block 1104A for clarity of representation, it being understood that these are similar in blocks 1104B-D. Within each node (or management system), the data streaming application code executes, possibly in multiple concurrent threads (represented in simplified form as block 1105), until a trace instruction is encountered. The trace instruction causes a check whether tracing is enabled (block 1106). If not, the 'N' branch is taken from block 1106, and execution resumes. If tracing is enabled, trace code determines whether the event and the current state data match the tracing parameters which were specified when execution was invoked (block 1107). For example, if particular events such as tuple creation, tuple transmission from one processing element to another, and/or tuple output are to be traced, the trace code verifies that the trace instruction causing temporary halt in execution came from one of these events; if tracing of a particular tuple type was specified, the trace code verifies that the tuple associated with the trace event is of the specified type; and so forth. If the event/state data do not match the specified tracing parameters, the 'N' branch is taken from block 1107, and execution resumes; otherwise, the 'Y' branch is taken, and the trace code determines the extent of trace data to be saved (block 1108). Almost any data could be saved in a trace, but in one or more embodiments, the saved trace data includes a copy of the tuple associated with the traceable event and the location in the operator graph at which the tuple was at the time of the traceable event. This data is then saved in the local trace data 318, or, if the trace instructions are executing in the management node, in management node trace data 527 (block 1109).

At some point, an exit condition is encountered during execution, causing execution of the program to end, as indicated by the flow line to the END block. Such an exit condition could be, e.g., completion of procession all data, an interrupt, an error condition, or other exit condition.

Profile trace data could be collected by tracing during one or multiple execution instances of the data streaming application, and might be refined or periodically updated over time as more is learned about the behavior of the data streaming application or as changes to the application code or the data upon which it typically operates cause changes to the application's behavior.

Generation of Profile Summary Data

In accordance with one or more embodiments, the collected profile data is analyzed using profile data analyzer 523 in management system 105 to produce a set of profile summary records 526. The profile summary records correlate specific tuple types occurring at specific locations within the operator graph with tuple types which are output to the database, and specify some measure of the number of output tuples of particular type which can be projected to be produced.

FIG. 12 is a conceptual illustration of the structure of an exemplary set of profile summary records 526, according to various embodiments. These records characterize previously observed flows of tuples within the data streaming application, and may be used, among other things, for projecting data to be added to database 140 from data which is currently "in-flight", i.e., being streamed within the data streaming application.

Referring to FIG. 12, the profile summary data 526 contains multiple records 1201, each record corresponding to a single type of tuple, its location within the operator graph 132, and type of tuple which may be output to the database as a result, and expressing one or more expectation values with respect thereto. Each record 1201 in the profile summary data contains an output tuple type field 1202 specifying the type of tuple which is output to the database, a graph location field 1203 specifying the location within the operator graph to which the corresponding record pertains, and an internal tuple type field 1204 specifying the type of tuple which is temporarily held at the corresponding location within the operator graph. It is possible that the output tuple type specified in field 1202 will be the same as the internal tuple type specified in field 1204. In one or more embodiments, the record further contains a key field identifier 1205 specifying a key field within the internal tuple type specified in field 1204, and a variable number of key field specifics 1206, each specific specifying a corresponding minimum value 1207, a corresponding maximum value 1208, and a corresponding expectation value 1209.

Taken together, the profile summary record 1201 specifies an expectation value for a particular tuple at a particular graph location having a particular key value of the key field. I.e., a record specifying output tuple type OT in field 1202, graph location L in field 1203, internal tuple type IT in field 1204, key field K in field 1205, minimum key value MIN in a field 1207, maximum key value MAX in field 1208, and expectation value E in field 1209, is interpreted to mean that a single tuple of type IT at graph location L having a value in key field K between MIN and MAX can be projected to produce E tuples of type OT for input to the database. The expectation value E may be expressed as a floating point value which in many cases will be between 0 and 1, but it is possible for E to exceed 1, i.e., for a single tuple of type IT to result in the output of multiple tuples of type OT. Alternatively, the expectation value may be stored as a pair of values, the expectation value being derived as the quotient of the pair of values. For example, the pair of values may be two integers which represent a count of a number of tuples of type OT (and optionally having particular parameters) output and a count of a number of tuples of type IT (and optionally having particular parameters) found at the subject graph location.

In one or more alternate embodiments, the key field 1205 and key field specifics 1206 may be optional or not used, and a single expectation value is specified for the internal tuple type and graph location, i.e., a single expectation value regardless of the values of any data within the corresponding tuple.

In one or more further alternate embodiments, the profile summary record 1201 includes a variable number of stable field identifier pairs 1210, each specifying a respective output stable field 1211 and corresponding internal stable field 1212 of a stable field pair. As used herein, a "stable field pair" is an ordered pair of fields, one field of the pair in the internal tuple, and another in the output tuple, in which the value of the field in the output tuple is derived directly from the value of the field in the internal tuple without modification. Knowledge of stable field pairs can be used to further refine projected changes to data in a database, for example, in response to a query in which a user is interested only in a particular subset of values in the stable field.

The data collected by tracing may be analyzed in any of various ways to produce profile summary records 526. Conceptually, the analysis amounts to determining, for each tuple output to the database, for each location the tuple or a parent tuple passed through in the operator graph, and for each internal tuple (or parent tuple) at that location, the number of internal tuples at the location and the number of resultant tuples output to the database. Additionally, if one or more key fields are identified, these numbers are broken down by range of values in the key field. Further, stable fields can be identified by comparing field values in the internal tuples with those of the resultant output tuples.

Figure 13:
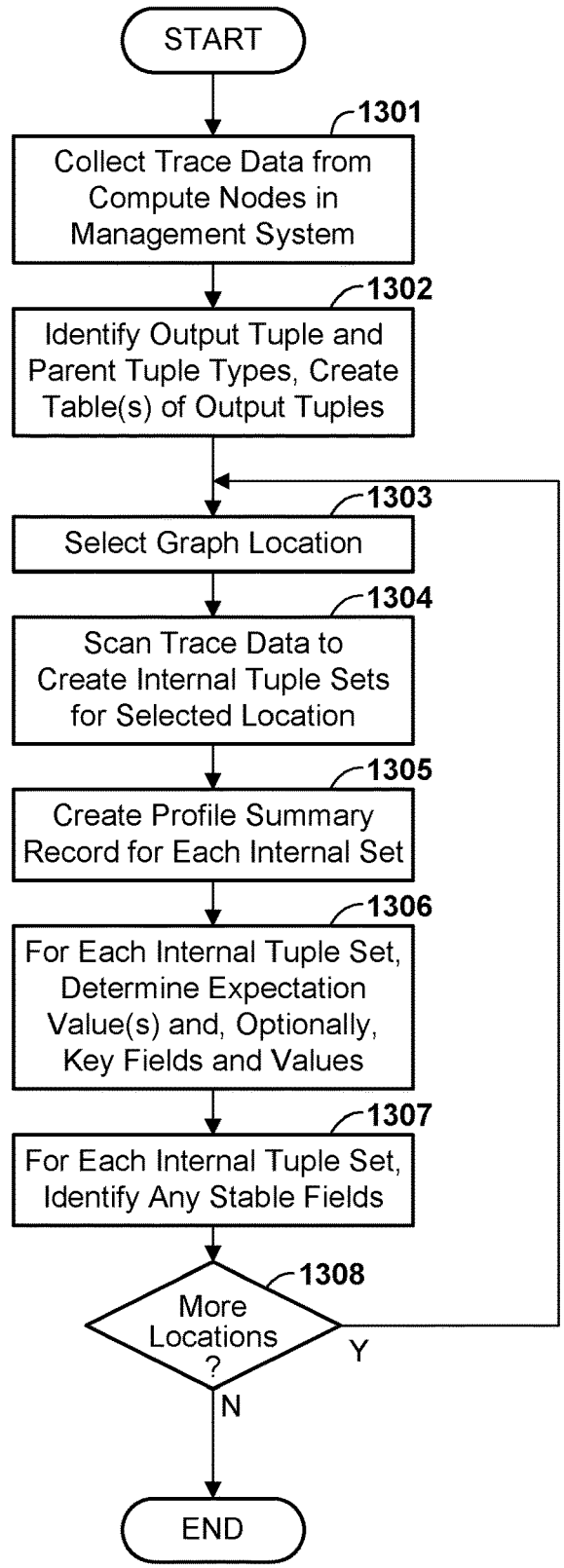
FIG. 13 is a flow diagram illustrating at a high level a process of analyzing profile data to produce a set of profile summary records, according to various embodiments.

FIG. 13 is a flow diagram illustrating at a high level a process of analyzing profile data to produce a set of profile summary records 526, according to various embodiments. This analysis is performed by or under the control of profile data analyzer 523 in management system 105.

Referring to FIG. 13, trace data collected in the various nodes and stored in respective local node trace data caches 318 of compute nodes 110 is transmitted to the management system 105 for analysis (block 1301). Collection of trace data in the management system is shown as a single block for simplicity of representation. It would in fact be possible to transmit all trace data to the management system at the beginning of analysis, as represented in FIG. 13. Alternatively, profile data analyzer 523 in management system 105 may request trace data in increments from the various compute nodes 110 as the analysis is performed. This latter approach would off-load some of the screening work to the compute nodes. For example, the management system may determine that only specific tuple types at specific locations generate output to the database, and accordingly request only those tuple types, thereby reducing consumption of network bandwidth during analysis, and reducing the burden on the management system of scanning a great deal of trace data which is ultimately not used.

The tuple type or types which are output to the database are identified, the parent tuple type(s), if any, of each tuple type which is output to the database are identified, and one or more tables are generated of all tuples output to the database during the trace (block 1302). The order of these actions may vary, depending on how the determinations are made. In some embodiments, it is possible that the output tuple types are known or determined from external commands received from the database, or by analysis of source code. However, for a generic application, it would always be possible to scan all the trace data, identify all tuples which are in fact output to the database during the trace data collection, and construct a list of tuple types which are output to the database from this data. Similarly, the parent types, if any, might be determined by analysis of source code or from external command, but for a generic application, it would always be possible to extract a list of parent tuple types by examining parent type fields 1006 of the output tuples. The table(s) of tuples, although referred to as tables, may be any convenient data structure for performing the analysis herein. All tuples of the same type which are output to the database constitute an output tuple set. Preferably, each output tuple set is placed in a separate respective table or other data structure. The table(s) of tuples output to the database may be indexed to assist further analysis, e.g., according to tuple identifier 1004.

For each location in the operator graph, the trace data is analyzed to produce a corresponding one or more profile summary records 1201. This is represented in FIG. 13 as blocks 1303-1308, by selecting a location in the operator graph (block 1303) and analyzing each location in turn. However, it will be appreciated that multiple actions may be performed concurrently by multiple threads of execution or otherwise. A "location" can be any subset of the operator graph in the data streaming application in which tuples might be temporarily held and at which they are traced. In one or more embodiments, the "locations" are processing elements in the operator graph, although the granularity of locations could be compute nodes, operators, or some other entity.

For the selected location, the tuples traced from that location are scanned to identify one or more sets of tuples (referred to herein as internal sets), each internal set corresponding to a tuple type of one of the output tuple sets, or a parent tuple type of the tuples in an output tuple set (block 1304). A corresponding profile summary record 1201 is generated for each such set (block 1305), the output tuple type 1202 being set to the corresponding type of the output tuple set, the graph location 1203 being set to the selected location, and the internal tuple type 1204 being set to the tuple type of the tuples in the internal tuple set.

For each internal tuple set from the selected location, one or more expectation values are determined and recorded in the profile summary record (block 1306). In one or more embodiments, a single expectation value for the profile summary record is derived as the quotient of the number of tuples in the corresponding output tuple set divided by the number of tuples in the internal tuple set. It would alternatively be possible to record the expectation value as a pair of integers corresponding to the count of tuples in the output tuple set and count of tuples in the internal tuple set. In one or more additional embodiments, multiple expectation values are determined, each corresponding to some range of values of one or more key fields. The key field(s) could be specified by some external command to the stream manager, or could be determined by the profile data analyzer 523 by analyzing the trace data. Specifically, any of various analytical techniques or tools could be used for finding correlations in data. In this case, the correlation sought is any correlation between a key field value and the expectation of producing an output tuple.

Therefore, in accordance with one or more embodiments, profile data analyzer 523 scans the internal tuple set and output tuple set to find key values or ranges of key values, if any, which correlate to a significantly higher or lower expectation value than the expectation value for the internal tuple set and output tuple set as a whole. In this case, the expectation value corresponding to a key value or key value range is expressed as the quotient having a divisor equal to the number of internal tuples in the internal tuple set having a specified key value or key value within the specified range, and a dividend equal to the number of tuples in output tuple set which are produced by any of the tuples counted in the divisor, i.e. which have a tuple ID 1004 or a parent tuple ID 1007 equal to the tuple ID of a tuple in the internal tuple set which has a specified key value or key value within the specified range. If such a key field or key fields and value ranges are identified, the key field is saved as key field 1205 in the profile summary record, and each value or range of values of interest, and their corresponding expectation values, are saved as a respective key field specific 1206 having a respective minimum value 1207 of the corresponding key field, a respective maximum value 1208 of the corresponding key field, and a respective expectation value 1209 corresponding to the expectation value for the internal tuple type at the selected operator graph location when the key field value lies in the range specified by the minimum 1207 and maximum 1208 values.

In one or more embodiments, for each internal tuple set, any stable fields are identified, and for each stable field, a corresponding stable field pair 1210 is added to the profile summary record 1201 (block 1307). It may be possible to identify stable fields from analysis of the source code, but for a generic application, stable fields may be identified by comparing the tuples in the internal set with the tuples in the corresponding output tuple set, even where the field names and/or internal and output tuple types are different. This may be done by scanning the entire set of internal tuples; for each internal tuple, determining whether a corresponding output tuple exists in the output tuple set (i.e., having the same tuple ID 1004 if the tuple types are the same, or having a parent tuple ID 1007 and parent type 1006 which are the same as the tuple ID 1004 and tuple type 1003 of the internal tuple); and if so, for the first such tuple pair found, creating a list of all field pairs for which the value of the field in the output tuple is the same as the value of the field in the input tuple; and for all subsequent pairs of an internal and an output tuple found, removing any field pair from the list if the values of the respective fields in the two tuples of the pair are not identical. Any field pairs remaining at the end of the scan are considered stable fields, and the corresponding field names in the output tuple and internal tuple of each such pair are recorded in a new stable field pair 1210 as stable field output 1211 and stable field internal 1212, respectively.

If any more operator graph locations remain to be analyzed, the 'Y' branch is taken from block 1308 and a next graph location is selected for analysis. When all graph locations have been analyzed, the profile summary records have been generated and populated with data, and the analysis of profile data is complete.

It will be appreciated that in the above description and the illustration of FIG. 13, various actions are shown and described as being performed sequentially for ease of understanding. However, for greater system efficiency, it may be possible to perform many of these actions concurrently by combining multiple scans of trace data into a single scan. It will further be understood that the order of certain actions could be changed without affecting the result of generating profile summary records. Finally, it will be appreciated that many variations in the form of profile data used to analyze in-flight data of interest are possible, and that the profile summary records described herein represent only some of the possible forms of profile data which may be used. Profile records may have other or additional fields; may be based on data other than or in addition to trace data; may characterize data streaming application behavior in a different way; and so forth.

Querying In-Flight Data

In accordance with one or more embodiments, in-flight data of the data streaming application is accessible from a database query initiated by a user of database 140. Including in-flight streaming data within the scope of a database query is preferably a user option which could be specified as one of the query parameters or otherwise; if in-flight streaming data is not included, the query is executed in a conventional manner against only data in the database itself. In one or more optional embodiments, a user may limit the scope of the queried data to particular portions of the data streaming application (e.g., buffers of particular processing elements). If in-flight streaming data is included, the query is executed against the streamed data by transmitting the query request to management system database agent 521 within the stream manager, which in turn transmits respective requests to respective compute node database agents 321 in each applicable compute node 110. Management system database agent 521 does not necessarily transmit every request to every compute note database agent 321, and may limit a request to specific compute nodes based on knowledge of the path or paths taken by tuples of interest to the query contained in operator graph 132 and/or operator graph profile data 525, and/or query scope restrictions specified by the user. Each compute node database agent(s) 321 receiving the query searches data in its buffer 313 to find any tuples matching the query parameters, and returns results to the management system database agent 521. Management system database agent 521 collects results and projects a likelihood that tuples of one or more types or attributes will be produced by the data streaming application for appending to one or more database tables, returning results to the database. Results may be returned for individual tuples in which an independent likelihood is represented for each tuple, or may be aggregated for groups of tuples, e.g., tuples having an identical key value or a key value within a specific range.

Figure 14:
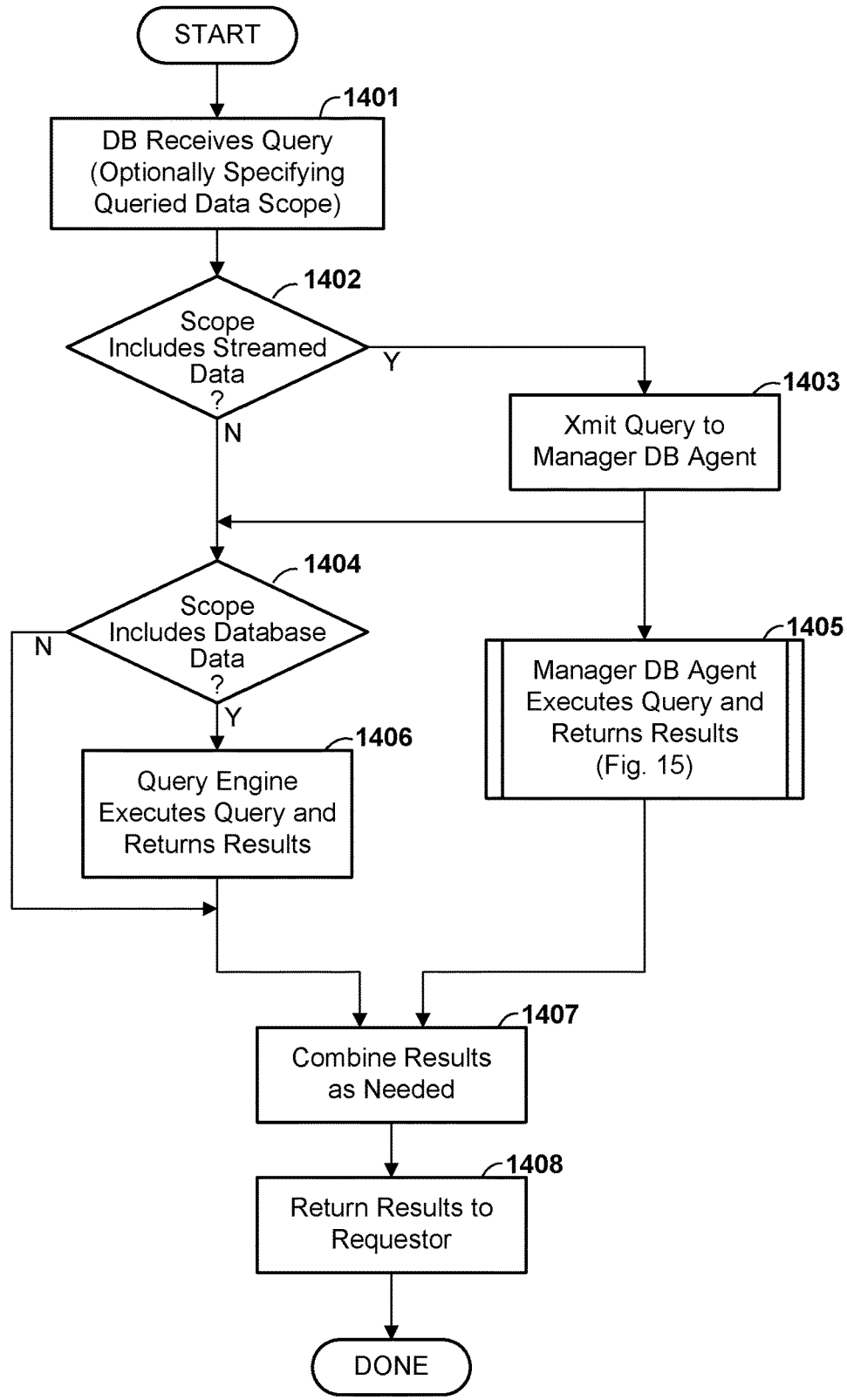
FIG. 14 is a flow diagram illustrating at a high level the operation of various system components in executing a database query, according to various embodiments.

FIG. 14 is a flow diagram illustrating at a high level the operation of various system components in executing a database query using database 140, according to various embodiments. Referring to FIG. 14, database manager 811 receives a database query initiated by a user (block 1401). The query might be received from an application 804, 805, executing on database system 115 or on a different system in communication with database system 115 over a network, using one or more external APIs 815. Alternatively, a query might be input to database manager 811 directly by a user through an internal user interface provided by the database manager.

The query either explicitly or implicitly specifies a queried data scope, i.e., specifies the scope of data to be searched for data meeting the query parameters, and to be used in generating query results. Conventionally, this query scope is limited to one or more database tables 821-823 of database 140. However, in accordance with various embodiments disclosed herein, a query may optionally specify that in-flight data of a data streaming application is to be included in the scope of the query. The manner in which query scope is specified may vary. In one or more embodiments, only the database is searched by default, and streamed data within the data streaming application is only searched if an optional extended search parameter is specified. In addition to specifying that streamed data is to be searched, a query may explicitly or implicitly limit the query scope to particular portions of the data streaming application. For example, a query may specify that only data associated with particular processing elements of the operator graph or in particular nodes will be searched for query results. Limiting the query scope to particular portions of the data streaming application generally requires special knowledge of the data streaming application on the part of the user, but there are instances where this capability may prove useful. For example, a user may know that tuples in a data stream before some location in the operator graph are subject to a high rate of change or deletion, and therefore considered unreliable as data, while tuples after that location are more stable; in this case, the user may wish to limit the query scope to nodes or processing elements downstream of that location.

If the queried data scope does not include data in the data streaming application, the 'N' branch is taken from block 1402, and blocks 1403 and 1404 are by-passed. If the queried data scope explicitly or implicitly includes data in the data streaming application, the 'Y' branch is taken from block 1402, and the database manager 811 transmits the query, including any optional parameters specifying queried data scope, to the database agent 521 within stream management system 105 (block 1403). In response, the management system database agent causes the query to be executed against streamed data, and ultimately returns query results to the database manager. This process is represented in FIG. 14 as block 1405, and shown in greater detail in FIG. 15.

Concurrently with transmitting the query to the management system (if the queried data scope includes streamed data), or without transmitting the query to the management system (if the queried data scope does not include streamed data), the database manager determines at block 1404 whether the queried data scope includes database data, i.e., data in one or more tables 821-823. If so (the 'Y' branch from block 1404), then the query engine 813 is invoked to execute the query against database data and return appropriate query results (block 1406). As is well known in the art, numerous techniques exist for executing queries against database table data, and the query against database data is performed using any conventional database query execution technique and/or techniques hereafter developed, and can involve the use of any of various metadata structures 824-831. If the queried data scope does not include database data, the 'N' branch is taken from block 1404, and block 1406 is skipped. Block 1404 thus enables the database manager to direct a query only to streamed data, and by-pass database data entirely. The directive to exclude database data from the queried data scope would initiate with the user submitting the query. It will be observed that the user may therefore direct the query to be executed against database data only, against streamed data only, or against both database data and streamed data. In one or more alternative embodiments, the user does not have the capability to exclude database data from the scope of the query, and all queries are executed against database data (i.e., block 1404 is not present).

When query results have been returned from all applicable sources, i.e., from the query engine 813 if the queried data scope includes database data, and from the management system database agent 521 if the queried data scope includes streamed data, the results are combined as needed (block 1407). The combined results are then returned to the requestor (block 1408).

The query results may be presented to the requesting user in any of various ways, and this may be performed by the database manager 811 or by an application program formatting query results for presentation to the user. Preferably query results representing data currently in one or more database tables are distinguished from query results representing in-flight data in the data streaming application. In one or more embodiments, query results are aggregated into counts of tuples satisfying the parameters of a query, which may be a single count for each tuple type or may be broken down according to range of some key value. In such a case, tuple counts representing tuples in the data streaming application may be modified by multiplying an actual count of tuples by an appropriate expectation value to produce a projected count of such tuples. This operation could be performed in the data streaming manager database agent, before returning results to the database, or performed in the database itself. In one or more further embodiments, an additional column is provided in the query results set for any in-flight data, the additional column indicating the likelihood that the in-flight data will make it into the database. I.e., this column is based on the expectation value from a profile summary record, which may be returned from the manager database agent to the database. Alternatively, an additional column provided with in-flight data may be used to indicate the location in the operator graph from which the data was in-flight data was derived.

Figure 15:
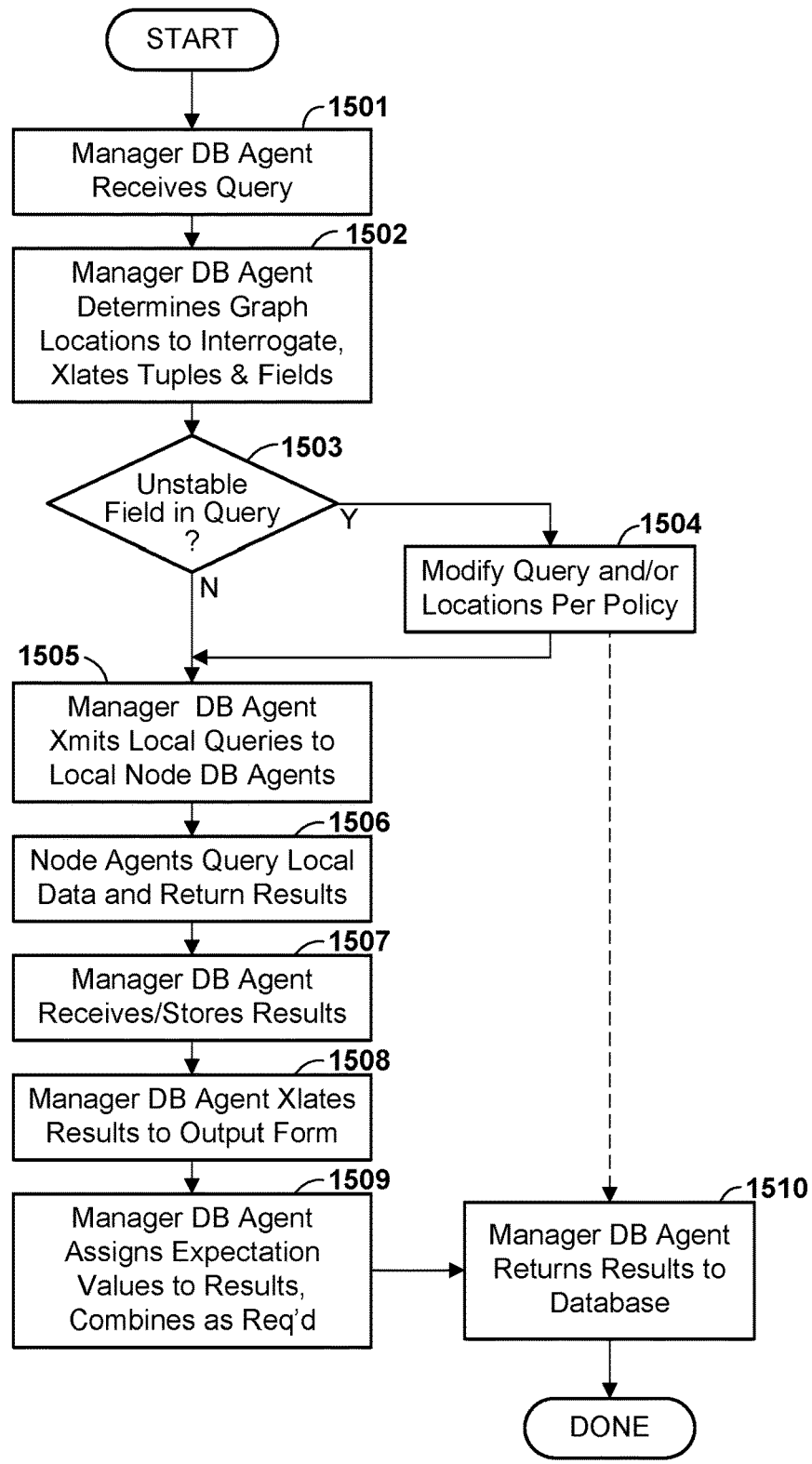
FIG. 15 is a flow diagram illustrating in greater detail a process of querying streamed data in a data streaming application, according to various embodiments.

FIG. 15 is a flow diagram illustrating in greater detail a process of querying streamed data in a data streaming application, according to various embodiments. Streamed data could be queried, as shown in FIG. 15 and represented as block 1405 in FIG. 14, in response to a database query submitted by a user to database manager 811. Alternatively, streamed data could be queried independently of any user-submitted database query. From the standpoint of the stream manager and local database agents in the various nodes, an incoming query of streamed data is simply responded to in the manner shown in FIG. 15 and described herein, regardless of the source of the query. For example, the database manager itself may initiate a query of streamed data for purposes of managing the organization of the database, such as creating metadata structures in advance, creating temporary buffer space, or other reasons.

Referring to FIG. 15, the management system database agent 521 in management system 105 functions as the point of contact for the database manager 811, and receives a query request from the database manager directing it to query data in the data streaming application (block 1501). In addition to the logical terms of the query itself, the query request from the database manager may contain queried scope data which restricts the query scope to selective portions of the data streaming application.

In response to receiving the query request, the management system database agent 521 determines the locations within the operator graph to be interrogated, and translates tuples and fields if required (block 1502). The manager database agent may access the applicable profile summary records 526 to determine locations within the operator graph at which the tuple or tuples which are the subject of the query can be found, and additionally, the type identifier for such tuples within the data streaming application if the type identifier is not the same as that used in the query request, e.g., not the same as that used by the database. As explained previously, each profile summary record 1201 corresponds to a respective output tuple type 1202 and respective graph location 1203. For each tuple type specified in the logical query, the profile summary records 1201 having output tuple type field 1202 corresponding to the tuple type of the query are identified, and a set of corresponding graph locations determined, this set of corresponding graph locations being a subset of all locations in the operator graph. If the query request further limits the queried data scope to some portion of the data streaming application, then any graph locations outside the specified queried data scope would be deleted from the set of graph locations.

Since tuples within the data streaming application may be generated from other tuples, and the names of tuples and fields used within the data streaming application are not necessarily the same as used in data output to the database, the manager database agent may translate tuples/fields specified in the logical query to tuples/fields used internally in the data streaming application for purposes of querying internal data. This again may be performed using the profile summary records 526. Each summary record 1201 specifying an output tuple type 1202 and graph location 1203 may also specify an internal tuple type 1204 corresponding to a tuple type used internally within the data streaming application at the corresponding graph location specified in graph location field 1203. If a tuple is specified in the logical query, this is an output tuple from the perspective of the profile summary record 1201, and is translated to the corresponding internal tuple specified in internal tuple type field 1204. Similarly, the profile summary record may contain one or more stable field output 1211 and corresponding stable field internal 1212 pairs. For each stable field specified in the logical query, the stable field output identifier 1211 is matched with the stable field, and is replaced in the logical query with the corresponding stable field internal identifier 1212 from the profile summary record.

If the query contains a logical condition referencing the value of an unstable field, then the 'Y' branch is taken from block 1503, and the query may be modified, the operator graph locations to be interrogated may be further restricted, or some other action may be taken, in accordance with an applicable policy for dealing with unstable fields (block 1504). If there are no unstable fields, the 'N' branch is taken from block 1503, and block 1504 is by-passed. A field specified in the logical query is deemed unstable if it is not in the listing of stable fields in the applicable profile summary record, i.e., if there is no pair of stable output field identifier 1211 and stable internal field identifier 1212 corresponding to the field specified in the logical query. It will be noted that a field may be stable in one or more profile summary records, while the same field is unstable in one or more other profile summary records. This is a result of the fact that a field may change at some location in the operator graph, so that operator graph locations upstream of the field change may show an unstable field, while downstream locations may show a stable field.

At block 1504, the manager database agent implements a policy for dealing with logical queries referencing unstable fields. Such a policy may vary. One example of such a policy would be to abort execution of the query in the data streaming application and return an error message (indicated by the dashed line from block 1504 to end), although it is generally preferable to provide some information where possible. Another example of such a policy would be to restrict the queried data scope to locations in which the field is stable, i.e., to interrogate only the operator graph locations for which the fields are stable when finding tuples responsive to the logical query. Such a policy would generally result in fewer tuples matching the parameters of the query. It could even result in a null set of locations to be interrogated, and correspondingly, no tuples matching the parameters of the query. If this is done, it is also preferable to provide a message to the requesting database indicating the action taken.

Another example of such a policy would be to replace any condition referencing the unstable field with a wildcard value, which would generally have the effect of increasing the number of tuples matching the parameters of the query. If such a policy were used, it would be possible to adjust the results for this inaccuracy by, e.g., using a histogram or other data estimate the proportion of output tuples having a value within the range specified in the applicable query condition. For example, suppose that field X.f is deemed unstable and the query contains the AND condition: $val1 \leq X.f \leq val2$. If it can be determined by reference to a histogram or other data that $val1 \leq X.f \leq val2$ in 20% of the tuples output by the data streaming application, then the number of tuples found using a wildcard value in the query can be multiplied by 0.20 to provide an estimate of the number of tuples matching the terms of the query. Similarly, if individual records are returned from a query with corresponding expectation values derived from the profile summary records, each of the expectation values can be adjusted by multiplying by the same percentage.

After any translation or other modification of the query in blocks 1502 and 1504, the management system database agent 521 transmits the query, modified as explained above, to the local database agent 321 in each compute node previously determined to receive the query (block 1505). These queries are referred to herein as the local queries, to distinguish them from the query received by the management system from the database, although they may in fact be identical to the query received by the management system from the database. Due to the possible existence of unstable fields at some graph locations and not others or changes to type names of tuples and/or field names within tuples, the local query transmitted to each compute node may vary. Furthermore, the managers' database agent may transmit multiple differently expressed local queries to the same compute node for interrogating different locations (e.g., different operator graph processing elements) within the same compute node.

Responsive to receiving the local queries, each local database agent 321 queries local data in accordance with the received local query(ies) and returns results to the management system database agent 521 (block 1506). Data may be queried, e.g., by scanning all tuples within a local buffer 314 or other applicable tuple storage to find tuples matching the terms of a query (similar to a table scan of a database table). Data may alternatively be queried using any of various more sophisticated techniques for querying data as are known in the database art. For example, if tuples within a buffer are organized into partitions or similar structures based on a key value, this partitioning may be used to reduce the scope of tuples which must be examined to respond to the local query. It would also be possible to use metadata structures (not shown) such as indexes to improve the efficiency of local query execution, although maintenance of metadata structures entails some overhead which must be justified by the frequency of use. Local query results may be returned to the stream manager as raw data, i.e. as the actual tuples found to match the terms of the local query, or as aggregated data, i.e., as a total number of tuples or total number of tuples in each of multiple categories.

The management system database agent 521 receives the response(s) to the local query(ies) and temporarily stores them in query results cache 528 (block 1507). If required, the agent translates the received results back to output form, i.e., to the form used by the database (block 1508). This is essentially the reverse of the translation performed at block 1502. I.e., if the name of a tuple type or field within a tuple is different in the local returned data from that used in the tuple output to the database, the profile summary records 526 are used to translate the internally used names back to those used in the tuples which are output to the database.

The management system database agent uses the profile summary records to assign expectation values to the results, and aggregates results as required (block 1509). Expectation values can be assigned either to individual tuples or to aggregated totals of tuples from a particular location. The expectation value assigned to a particular tuple or aggregated group of tuples is the expectation value from expectation value field 1209 of the profile summary record 1201 corresponding to the output tuple type 1202 and location 1203 of the corresponding tuple/tuple group and location in the graph from which it was derived, and having a key field value between the applicable minimum and maximum from fields 1207 and 1208 of the profile summary record. If the query results will be reported only as aggregated results, the number of tuples in each aggregated group is multiplied by the corresponding expectation value to yield a projected number of records of the corresponding aggregated group.

The management system database agent 521 may further combine or aggregate tuples or groups of tuples to report results as a single aggregated group or multiple groups, either according to some pre-existing policy or aggregation or the terms of the query request. In aggregating tuples/groups, a projected total number for an aggregated group of tuples is obtained by combining the projected numbers of the constituent groups or adding the expectation values of multiple individual tuples. Alternatively, if the policy or terms of the query request so provide, the management system may associate a respective expectation value with each individual tuple and report each individual tuple and its associated expectation value back to the database as query results. The management system may further report additional potentially useful data with respect to each tuple, for example, a location within the operator graph from which the tuple was obtained.

When results have been processed in the management system database agent as described, they are returned to the database (block 1510), and the process of querying streamed data in the data streaming application ends.

In the embodiments described above, the database agent in the management system manages the profile data and performs any modifications of the query. However, some or all of these actions might alternatively be performed by the database itself, or by some other component within the data streaming application. For example, operator graph profile data or alternative data might be provided to the database, which performs any required translation of the logical query before the same is transmitted to the data streaming application, and performs any required translation of results after the same are received. As a further example, certain profile data might be provided to the local compute nodes, which perform translations and/or assign expectation values.

Because data in the data streaming application is dynamic, there exists the possibility that one or more tuples will be counted twice and/or will be skipped when multiple local queries are executed concurrently at respective compute nodes. Since projections of data entering the database at some future time is, by their nature, inexact, this does not necessarily prevent any useful application of the projected data. The projection is only intended to provide an approximation of future changes to the database, and as long as the number of miscounted tuples is small in relation to the total number being counted, the projection remains more or less correct.

Modifying In-Flight Data

In accordance with one or more embodiments, the database agent 321 in the management system and the local compute node database agents 521 in each compute node 110 can be used to modify in-flight data of the data streaming application responsive to a modify data command initiated by a user of database 140. This may be performed in a manner similar to the querying of data initiated by a user of the database.

A modify data command is a database supported command to apply a data modify operation (i.e., a delete of a tuple or an editing of the contents of at tuple) to one or more selective tuples of the database, the tuples being selected according to logical parameters of the modify data command. These logical parameters may be similar to the logical parameters of a database query.

In accordance with one or more embodiments, in-flight streaming data may be included within the scope of a modify data command. In-flight streaming data might be included for any of various reasons. For example, if a particular subset of tuples is no longer to be maintained in the database, then deleting tuples of that subset from the data streaming application amounts to deleting extraneous data, which may improve the efficiency of the data streaming application and/or remove the need to later delete the product of in-flight data from the database. In another example, a global correction might be applied to some subset of data, where correcting the in-flight data as well avoids the need for later downstream corrections. Although it is theoretically possible to modify a single tuple, it is typically expected that the modify data command is applied to multiple tuples defined by the logical parameters of the command.

Including in-flight streaming data within the scope of a modify data command is preferably a user option which could be specified as one of the command parameters or otherwise; if in-flight streaming data is not included, the modify data command is executed in a conventional manner against only data in the database itself. In one or more optional embodiments, a user may limit the scope of the data subject to the modify data command to particular portions of the data streaming application (e.g., buffers of particular processing elements). If in-flight streaming data is included, the modify data command is applied to the streamed data by transmitting the command to management system database agent 521 within the stream manager, which in turn transmits respective commands to respective compute node database agents 321 in each applicable compute node 110. Management system database agent 521 does not necessarily transmit every modify data command to every compute note database agent 321, and may limit a command to specific compute nodes based on knowledge of the path or paths taken by tuples which are the subject of the data modify command contained in operator graph 132 and/or operator graph profile data 525, and/or command scope restrictions specified by the user. Each compute node database agent(s) 321 receiving the modify data command searches data in its buffer 313 to find any tuples matching the command's logical parameters, and applies the data modify operation specified by the command to any matching tuples it finds. The compute nodes may return an acknowledgment to the management system database agent 521, which may contain detailed data concerning the extent of modified data. The management system database agent 521 may in turn provide acknowledgment information to the database manager.

Figure 16:
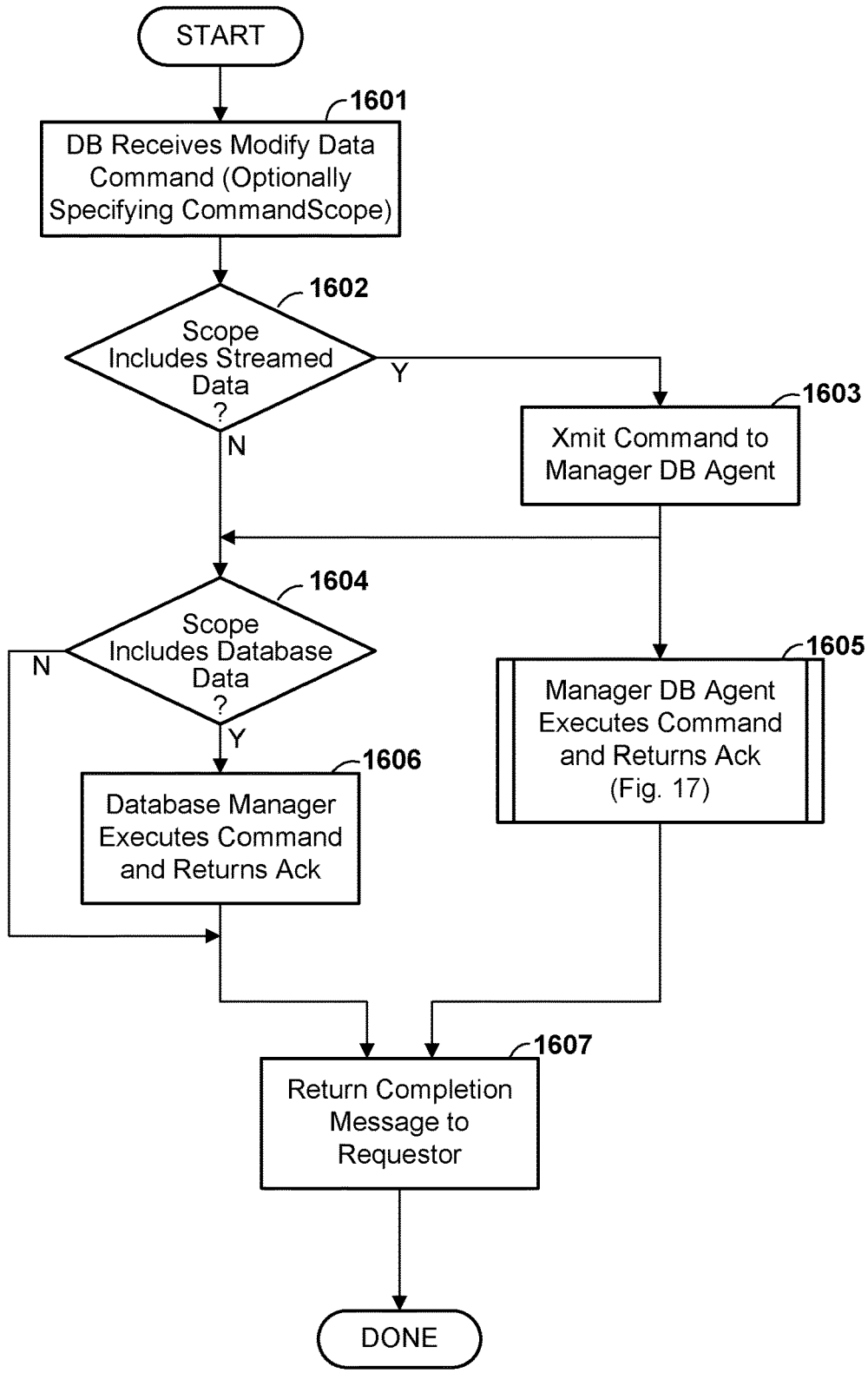
FIG. 16 is a flow diagram illustrating at a high level the operation of various system components in executing a modify data command, according to various embodiments.

FIG. 16 is a flow diagram illustrating at a high level the operation of various system components in executing a modify data command using database 140, according to various embodiments. Referring to FIG. 16, database manager 811 receives a modify data command initiated by a user (block 1601). The command might be received from an application 804, 805, executing on database system 115 or on a different system in communication with database system 115 over a network, using one or more external APIs 815. Alternatively, a modify data command might be input to database manager 811 directly by a user through an internal user interface provided by the database manager.

The modify data command either explicitly or implicitly specifies a command scope, i.e., the scope of data to be searched for data meeting the logical parameters of the command, to which the data modify operation will be applied. Conventionally, this command scope is limited to one or more database tables 821-823 of database 140. However, in accordance with various embodiments disclosed herein, a modify data command may optionally specify that in-flight data of a data streaming application is to be included in the scope of the command. The manner in which command scope is specified may vary. In one or more embodiments, only the database is searched by default, and streamed data within the data streaming application is only searched if an optional extended modify data parameter is specified. In addition to specifying that streamed data is to be included in the command scope, a modify data command may explicitly or implicitly limit the command scope to particular portions of the data streaming application. For example, a command may specify that only data associated with particular processing elements of the operator graph or in particular nodes will be subject to modification. Limiting the command scope to particular portions of the data streaming application generally requires special knowledge of the data streaming application on the part of the user, but there are instances where this capability may prove useful.

If the scope of the modify data command does not include data in the data streaming application, the 'N' branch is taken from block 1602, and blocks 1603 and 1604 are by-passed. If the command scope explicitly or implicitly includes data in the data streaming application, the 'Y' branch is taken from block 1602, and the database manager 811 transmits the command, including any optional parameters specifying command scope, to the database agent 521 within stream management system 105 (block 1603). In response, the management system database agent causes the modify data command to be applied to streamed data, and may optionally return an acknowledgment and/or indication of actions that were performed to the database manager. This process is represented in FIG. 16 as block 1605, and shown in greater detail in FIG. 17.

Concurrently with transmitting the modify data command to the management system (if the command scope includes streamed data), or without transmitting the command to the management system (if the command scope does not include streamed data), the database manager determines at block 1604 whether the modify data command scope includes database data, i.e., data in one or more tables 821-823. If so (the 'Y' branch from block 1604), then the query engine 813 is invoked to execute the modify data command against database data (block 1606). Any conventional technique known in the database art may be used for executing the modify data command against data in one or more database tables 821-823. If the modify data command scope does not include database data, the 'N' branch is taken from block 1604, and block 1606 is skipped. Block 1604 thus enables the database manager to apply data modify operations only to streamed data, and by-pass database data entirely. The directive to exclude database data from the scope of the modify data command would initiate with the user submitting the query. It will be observed that the user may therefore direct the modify data command to be applied to database data only, to streamed data only, or to both database data and streamed data. In one or more alternative embodiments, the user does not have the capability to exclude database data from the scope of the modify data command, and all such commands are applied to database data (i.e., block 1604 is not present).

After the modify data command has been executed against all applicable data in the database and/or data streaming application, as the case may be, a completion message is returned to the user (block 1607). This message may optionally include statistics such as the number of tuples deleted/modified and so forth. Such statistics may optionally include location(s) in a data streaming operator graph and/or database table at which data was modified.

Figure 17:
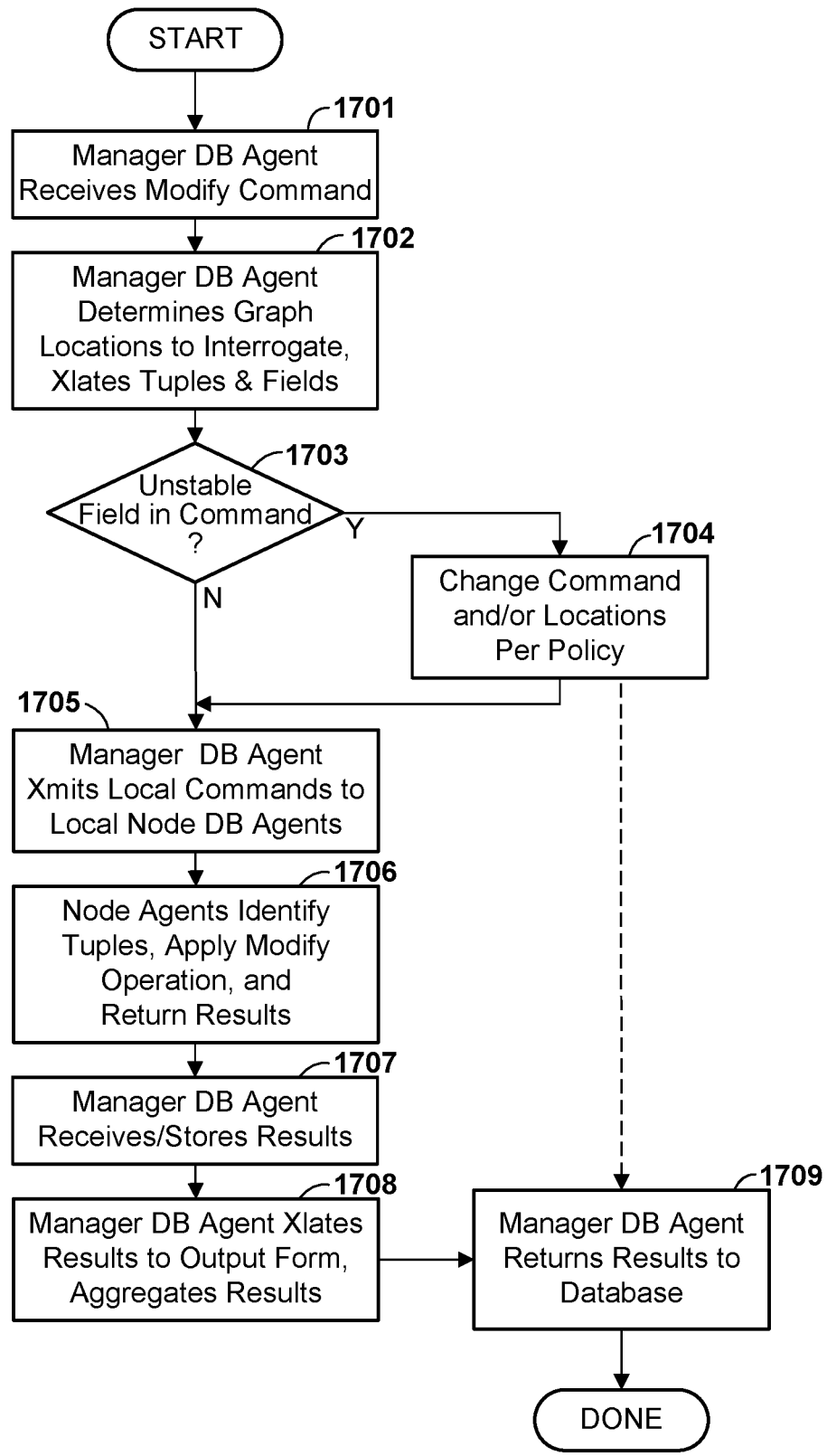
FIG. 17 is a flow diagram illustrating in greater detail a process of modifying streamed data in a data streaming application, according to various embodiments.

FIG. 17 is a flow diagram illustrating in greater detail a process of modifying streamed data in a data streaming application responsive to a modify data command from the database, according to various embodiments. Streamed data could be modified, as shown in FIG. 17 and represented as block 1605 in FIG. 16, in response to a modify data command submitted by a user to database manager 811.

Referring to FIG. 17, the management system database agent 521 in management system 105 functions as the point of contact for the database manager 811, and receives a modify data command from the database manager directing it to perform a data modify operation on selective data in the data streaming application (block 1701). In addition to the logical parameters defining the data (tuples) which are to be modified and the data modify operation to performed, the command from the database manager may contain scope data which restricts the scope of the command to selective portions of the data streaming application.

In response to receiving the modify data command, the management system database agent 521 determines the locations within the operator graph to be interrogated, and translates tuples and fields if required (block 1702). This operation is analogous to that performed with queries, as described above with respect to block 1502. The manager database agent may access the applicable profile summary records 526 to determine locations within the operator graph at which the tuple or tuples which are the subject of the modify data command can be found, and additionally, the type identifier for such tuples within the data streaming application if the type identifier is not the same as that specified by the command. For each tuple type specified in the command, the profile summary records 1201 having output tuple type field 1202 corresponding to the tuple type of the command are identified, and a set of corresponding graph locations determined, this set of corresponding graph locations being a subset of all locations in the operator graph. If the modify data command further limits the scope of data to be modified to some portion of the data streaming application, then any graph locations outside the command's scope would be deleted from the set of graph locations.

The manager database agent may use the profile summary records 526 to translate the names of any tuples and fields specified in the modify data command to tuples/fields used internally in the data streaming application for purposes of modifying internal data. I.e., each summary record 1201 specifying an output tuple type 1202 and graph location 1203 may also specify an internal tuple type 1204 corresponding to a tuple type used internally within the data streaming application at the corresponding graph location specified in graph location field 1203. A tuple specified in the modify data command is an output tuple from the perspective of the profile summary record 1201, and is translated to the corresponding internal tuple specified in internal tuple type field 1204. Similarly, the profile summary record may contain one or more stable field output 1211 and corresponding stable field internal 1212 pairs. For each stable field specified in the command, the stable field output identifier 1211 is matched with the stable field, and is replaced in the command with the corresponding stable field internal identifier 1212 from the profile summary record.

If the modify data command contains a logical condition referencing the value of an unstable field, then the 'Y' branch is taken from block 1703, and appropriate action is taken in accordance with an applicable policy for dealing with unstable fields (block 1704). If there are no unstable fields, the 'N' branch is taken from block 1703, and block 1704 is by-passed. A field specified in the command is deemed unstable if it is not in the listing of stable fields in the applicable profile summary record, i.e., if there is no pair of stable output field identifier 1211 and stable internal field identifier 1212 corresponding to the field specified in the command. As explained above, a field may be considered stable at some operator graph locations and unstable at others.

At block 1704, the manager database agent implements a policy for dealing with modify data commands which reference unstable fields. This policy could be, but is not necessarily the same as, the policy for dealing with unstable fields in a query. In general, data should not be modified where uncertainty exists, and accordingly a typical policy would be to abort execution of the data modify command (shown as the dashed line to block 1709) or to restrict the scope of any data modify operation only to tuples which are selected according to a value of a stable field, although other policies are possible.

After any translation or other modification of the modify data command in blocks 1702 and 1704, the management system database agent 521 transmits the command, modified as explained above, to the local database agent 321 in each compute node previously determined to receive the command (block 1705). These commands are referred to herein as the local data modify commands, to distinguish them from the command received by the management system from the database, although they may in fact be identical to the command received by the management system from the database. Due to the possible existence of unstable fields at some graph locations and not others or changes to type names of tuples and/or field names within tuples, the local command transmitted to each compute node may vary. Furthermore, the managers' database agent may transmit multiple differently expressed local commands to the same compute node for interrogating different locations (e.g., different operator graph processing elements) within the same compute node.

Responsive to receiving the local commands, each local database agent 321 examines the applicable local data within the command's scope to identify all tuples meeting the logical parameters of the command, applies the data modify operation specified by the command to each such tuple, and returns an acknowledgment or completion message. (block 1706). Identifying applicable tuples may be performed in a manner similar to execution of a query as described above, using any local metadata or organizational structure. The data modify operation may include any of deletion of a tuple, setting one or more tuple fields to some specified value(s), computing a value for a tuple field, or addition or deletion of one or more tuple fields. Each local database agent may return an acknowledgment/completion message indicating that the command has been or will be performed on local data. The acknowledgment/completion message may include statistical data such as the number of tuples modified, number of tuples in each of multiple subsets divided according to some key value or values, computed values of modified tuple fields, if any, and so forth.

The management system database agent 521 receives the response(s) to the local modify data command(s) and temporarily stores them locally (block 1707). If required, the agent aggregates any statistical data received from multiple local agents and translates the received statistical data back to output form, i.e., to the form used by the database (block 1708). This is essentially the reverse of the translation performed at block 1702. I.e., if the name of a tuple type or field within a tuple is different in the local returned data from that used in the tuple output to the database, the profile summary records 526 are used to translate the internally used names back to those used in the tuples which are output to the database. Statistical data reported back to the database may include a location or location(s) at which subsets of tuples were modified.

When results have been processed in the management system database agent as described, they are returned to the database (block 1709), and the process of modifying streamed data in the data streaming application ends.

In the embodiments described above, the database agent in the management system manages the profile data and performs any translation or other modification of the data modify command. However, some or all of these actions might alternatively be performed by the database itself, or by some other component within the data streaming application. For example, operator graph profile data or alternative data might be provided to the database, which performs any required translation of the command before the same is transmitted to the data streaming application, and performs any required translation of results after the same are received. As a further example, certain profile data might be provided to the local compute nodes, which perform translations as required.

Thus, in one or more embodiments, when a modify data command is sent from the database to the data streaming application, the modifications it makes can simply all be specified from the perspective of the streaming application. The received modified data command would contain all the parameters, from the perspective of the data streaming application, needed to identify operators and change tuple values. In other embodiments, the database user or the database need not know any such information specific to the data streaming application, and the data streaming application modifies the received modify data command as required using its own profile data or other metadata, as described herein.

In one or more additional alternative embodiments, the data streaming application may project, based on profiling data or otherwise, whether execution of a received data modify command or a received query against data in the data streaming application is likely to cause an undue backup of data in the streaming application, and take appropriate action if an undue backup is projected. Such action could include not executing the modify data command or query, or executing it only against some part of the operator graph.

Additional Embodiments Modifying In-Flight Data

In various embodiments described above, a complete system for both querying and modifying in-flight data in a data streaming application from a database has been described, in which certain data structures and/or functional elements are used for both querying and modifying the in-flight data. However, the capability to query in-flight data and to modify in-flight data may alternatively exist independently, so that only one of these capabilities is provided. Additionally, even if both functional capabilities are provided by a single database and associated data streaming application, they may use separate functional elements and/or data structures.

In particular, in one or more alternative embodiments, the database modifies in-flight data of the data streaming application but does not query in-flight streamed data.

In one or more additional alternative embodiments, operator graph profiling data is not used for modifying in-flight data. Such profiling data may be unnecessary because, e.g., no translation of tuples is required, or the capability to translate tuples is not supported and data modify and/or query operations can only be executed against tuples of the output type. Alternatively, other means may be provided for modifying tuples where different internal type names are used or there are unstable fields, e.g., different types of metadata may be used, a user may input the tuple type to be modified or specify stable fields, source code analysis may provide type names, etc.

Other Variations

Although a series of steps has been described above as one or more preferred and/or alternate embodiments, it will be appreciated that many variations of processes for characterizing a data streaming application, accessing in-flight data within a data streaming application, and analyzing accessed data to project data entering a database are possible. In particular, some steps may be performed in a different order, different data structures may be used, and/or different hardware or software resources may be employed to perform functions described herein. Furthermore, although certain formulae, thresholds, logical conditions, and so forth may have been disclosed as one or more embodiments, it will be appreciated that these formulae, thresholds, logical conditions, etc., and variations thereof are only some of the possible embodiments, and that other techniques could alternatively be used.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. Examples of a computer readable storage medium are illustrated in FIG. 2 as system memory 202 and data storage devices 225-227. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Unless inconsistent with the invention or otherwise qualified herein, computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although a specific embodiment of the invention has been disclosed along with certain alternatives, it will be recognized by those skilled in the art that additional variations in form and detail may be made within the scope of the following claims:

What is claimed is:

1. A computer-executed method, comprising:
receiving in a structured database containing a plurality of tuples a modify data command, the modify data command specifying a modify data operation to be applied to each of one or more tuples and logical parameters of tuples to which the modify data command is to be applied;
responsive to receiving in said structured database the modify data command, forwarding the modify data command from said structured database to a data streaming application, said data streaming application receiving input from a source independent of data contained in said structured database and producing output data from said input, the output data being provided to said structured database for inclusion in said structured database;
identifying, in said data streaming application, in-flight data tuples of said data streaming application matching parameters of the forwarded modify data command;
wherein identifying, in said data streaming application, in-flight data tuples of said data streaming application matching parameters of the forwarded modify data command comprises using operator graph profile data characterizing the data streaming application, said operator graph profile data being obtained by collecting trace data from at least one previous execution instance of said data streaming application, and analyzing the collected trace data to produce said operator graph profile data characterizing the data streaming application; and
applying, in said data streaming application, the modify data operation specified by the modify data command to each in-flight data tuple identified by said identifying, in said data streaming application, in-flight data tuples of said data streaming application matching parameters of the forwarded modify data command.

2. The computer-executed method of claim 1, further comprising:
responsive to receiving in said structured database the modify data command, determining in said structured database whether a scope of the modify data command includes in-flight data of said data streaming application, wherein the modify data command is forwarded from said structured database to said data streaming application only if the structured database determines that the scope of the modify data command includes in-flight data of said data streaming application.

3. The computer-executed method of claim 2, wherein said modify data command includes scope data identifying a portion of said data streaming application containing the in-flight data of said data streaming application, said portion being less than all of said data streaming application, wherein said identifying, in said data streaming application, in-flight data of said data streaming application matching parameters of the forwarded modify data command, comprises searching only said portion for the in-flight data matching parameters of the forwarded modify data command.

4. The computer-executed method of claim 1,
wherein the output data produced by said data streaming application for inclusion in said structured database comprises a plurality of tuples of an output type, the output type being a type defined by said structured database, and wherein the in-flight data in said data streaming application comprises a plurality of tuples of an internal type which is different from a type defined by said structured database; and
wherein identifying, in said data streaming application, in-flight data tuples of said data streaming application matching parameters of the forwarded modify data command comprises translating the forwarded modify data command to apply to tuples of the internal type, and identifying tuples of the internal type matching the parameters of the translated forwarded modify data command.

5. The computer-executed method of claim 1, wherein said identifying, in said data streaming application, in-flight data tuples of said data streaming application matching parameters of the forwarded modify data command comprises:
sending, from a management system of said data streaming application to a respective agent in each of at least one compute node of said data streaming application, a respective modify data command to apply to respective data in the respective compute node of the plurality of compute nodes; and
identifying, in each of the at least one compute node, respective data matching the parameters of the respective modify data command sent from the management system to the respective agent in the respective compute node.

6. The computer-executed method of claim 1, further comprising:
returning, from the data streaming application to said structured database, a completion message, said completion message containing at least some statistical data with respect to tuples to which the modify data operation was applied.

7. The computer-executed method of claim 1, further comprising:
translating the modify data command query received from the requestor to a translated modify data command query for use in applying the modify data operation to the in-flight data of said data streaming application, the translated modify data command being produced by performing at least one of: (a) translating at least one output tuple type used by said database to a corresponding internal tuple type used by said data streaming application, or (b) translating at least one field name used by said database to at least one corresponding field name used by said data streaming application.

8. The computer-executed method of claim 1, further comprising:
verifying whether each tuple field referenced as a logical parameter of the modify data command corresponds to a stable field in said data streaming application; and
with respect to any tuple field referenced as a logical parameter of the modify data command which does not correspond to a stable field in said data streaming application, taking at least one action to modify the modify data command in accordance with a pre-existing policy.

9. The computer-executed method of claim 1, wherein said modify data operation comprises deletion of a tuple.

10. The computer-executed method of claim 1, wherein said modify data operation comprises altering a value of at least one field of a tuple.

11. A non-transitory computer-readable media having recorded thereon a computer program having a plurality of computer-executable instructions, wherein the computer program, when executed by at least one computer system, causes the at least one computer system to perform actions comprising:
receiving in a structured database a modify data command, the modify data command specifying a modify data operation to be applied to each of one or more tuples and logical parameters of tuples to which the modify data command is to be applied;
responsive to receiving in said structured database the modify data command, forwarding the modify data command from said structured database to a data streaming application, said data streaming application producing output for inclusion in said structured database, wherein said modify data command includes scope data identifying a portion of said data streaming application containing the in-flight data of said data streaming application, said portion being less than all of said data streaming application;
identifying, in said data streaming application, in-flight data tuples of said data streaming application matching parameters of the forwarded modify data command, wherein said identifying, in said data streaming application, in-flight data of said data streaming application matching parameters of the forwarded modify data command, comprises searching only said portion for the in-flight data matching parameters of the forwarded modify data command; and
applying, in said data streaming application, the modify data operation specified by the modify data command to each tuple identified by said identifying, in said data streaming application, in-flight data tuples of said data streaming application matching parameters of the forwarded modify data command.

12. The non-transitory computer-readable media of claim 11, wherein the computer program further causes the at least one computer system to perform actions comprising:
responsive to receiving in said structured database the modify data command, determining in said structured database whether a scope of the modify data command includes in-flight data of said data streaming application, wherein the modify data command is forwarded from said structured database to said data streaming application only if the structured database determines that the scope of the modify data command includes in-flight data of said data streaming application.

13. The non-transitory computer-readable media of claim 11,
wherein the output data produced by said data streaming application for inclusion in said structured database comprises a plurality of tuples of an output type, the output type being a type defined by said structured database, and wherein the in-flight data in said data streaming application comprises a plurality of tuples of an internal type which is different from a type defined by said structured database; and
wherein identifying, in said data streaming application, in-flight data tuples of said data streaming application matching parameters of the forwarded modify data command comprises translating the forwarded modify data command to apply to tuples of the internal type, and identifying tuples of the internal type matching the parameters of the translated forwarded modify data command.

14. The non-transitory computer-readable media of claim 11, wherein said identifying, in said data streaming application, in-flight data tuples of said data streaming application matching parameters of the forwarded modify data command comprises:
sending, from a management system of said data streaming application to a respective agent in each of at least one compute node of said data streaming application, a respective modify data command to apply to respective data in the respective compute node of the plurality of compute nodes; and
identifying, in each of the at least one compute node, respective data matching the parameters of the respective modify data command sent from the management system to the respective agent in the respective compute node.

15. The non-transitory computer-readable media of claim 11, wherein the computer program further causes the at least one computer system to perform actions comprising:
verifying whether each tuple field referenced as a logical parameter of the modify data command corresponds to a stable field in said data streaming application; and
with respect to any tuple field referenced as a logical parameter of the modify data command which does not correspond to a stable field in said data streaming application, taking at least one action to modify the modify data command in accordance with a pre-existing policy.

16. A data processing apparatus supporting execution of a data streaming application, comprising:
at least one physical processor;
at least one physical memory;
a data streaming application embodied as instructions executable on the at least one processor and storable in the at least one memory, the data streaming application implementing an operator graph having a plurality of processing elements which operate on data tuples being transferred among processing elements of the plurality of processing elements, the data streaming application receiving input from a source independent of data contained in a structured database and producing output tuples from said input, the output tuples being provided to the structured database for inclusion in the structured database;
at least one database agent associated with the data streaming application, the at least one database agent embodied as instructions executable on the at least one processor and storable in the at least one memory, wherein the at least one database agent:
receives a forwarded modify data command from said structured database, the modify data command specifying a modify data operation to be applied to each of one or more tuples and logical parameters of tuples to which the modify data command is to be applied;
responsive to receiving the forwarded modify data command from said structured database, identifies in-flight data tuples of said data streaming application matching parameters of the forwarded modify data command; and
applies, in said data streaming application, the modify data operation specified by the modify data command to each in-flight data tuple identified by identifying in-flight data tuples of said data streaming application matching parameters of the forwarded modify data command;

wherein said forwarded modify data command includes scope data identifying a portion of said data streaming application containing the in-flight data of said data streaming application, said portion being less than all of said data streaming application, wherein identifying in-flight data tuples of said data streaming application matching parameters of the forwarded modify data command comprises searching only said portion for the in-flight data tuples of said data streaming application matching parameters of the forwarded modify data command.

17. The data processing apparatus supporting execution of a data streaming application of claim 16, wherein said at least one database agent comprises:

a management database agent in a management system of said data streaming application; and at least one compute node database agent, each compute node database agent in a respective compute node of said data streaming application;

wherein the management database agent receives the forwarded modify data command from said structured database, and responsive thereto, sends, from the management system of said data streaming application to a respective compute node database agent of said at least one compute node database agent, a respective modify data command to be applied to respective data in the respective compute node;

wherein each compute node database agent identifies, responsive to receiving the respective modify data command to be applied to respective data in the respective compute node, respective data in the respective compute node matching the parameters of the respective modify data command sent from the management system to the respective agent in the respective compute node, and applies the data modify operation specified by the respective modify data command to the respective data in the respective compute node matching the parameters of the respective modify data command.

* * * * *